(12) United States Patent
Mori et al.

(10) Patent No.: US 11,289,979 B2
(45) Date of Patent: Mar. 29, 2022

(54) ROTARY ELECTRIC MACHINE

(71) Applicant: MITSUBISHI ELECTRIC CORPORATION, Chiyoda-ku (JP)

(72) Inventors: Takeshi Mori, Chiyoda-ku (JP); Moriyuki Hazeyama, Chiyoda-ku (JP); Masaru Shinozaki, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 232 days.

(21) Appl. No.: 16/496,260

(22) PCT Filed: Mar. 5, 2018

(86) PCT No.: PCT/JP2018/008389
§ 371 (c)(1),
(2) Date: Sep. 20, 2019

(87) PCT Pub. No.: WO2018/216304
PCT Pub. Date: Nov. 29, 2018

(65) Prior Publication Data
US 2020/0266686 A1    Aug. 20, 2020

(30) Foreign Application Priority Data

May 23, 2017  (JP) .............................. JP2017-101403

(51) Int. Cl.
*H02K 9/19* (2006.01)
*H02K 1/14* (2006.01)
(Continued)

(52) U.S. Cl.
CPC ................. *H02K 9/19* (2013.01); *H02K 1/14* (2013.01); *H02K 1/16* (2013.01); *H02K 3/28* (2013.01); *H02K 5/20* (2013.01)

(58) Field of Classification Search
None
See application file for complete search history.

(56) References Cited

U.S. PATENT DOCUMENTS

| | | | |
|---|---|---|---|
| 2006/0283004 A1 | 12/2006 | Ooiwa | |
| 2006/0284505 A1* | 12/2006 | Han | H02K 3/46 310/155 |
| 2017/0324286 A1* | 11/2017 | Akimoto | H02K 3/48 |

FOREIGN PATENT DOCUMENTS

| | | |
|---|---|---|
| JP | 8-149757 A | 6/1996 |
| JP | 2003-88011 A | 3/2003 |

(Continued)

OTHER PUBLICATIONS

Notice of Reasons for Refusal dated Apr. 28, 2020 in Japanese Patent Application No. 2019-519478.

(Continued)

*Primary Examiner* — Quyen P Leung
*Assistant Examiner* — Minki Chang
(74) *Attorney, Agent, or Firm* — Xsensus LLP

(57) ABSTRACT

Provided is a rotating electric machine. Angles formed by tooth center axes of adjacent teeth are defined as tooth pitch angles. Maximum tooth pitch angles are defined as first tooth pitch angles $\alpha 1$. At least one of tooth pitch angles become smaller as proceeding from the first tooth pitch angles $\alpha 1$ in a clockwise direction and a counterclockwise direction, respectively, and such tooth pitch angles are defined as second tooth pitch angles $\alpha 3$. Cross-sectional areas of second coils, which are arranged in slots each formed between adjacent teeth corresponding to the second tooth pitch angles $\alpha 3$ in a cross-section perpendicular to a rotation axis, is smaller than cross-sectional areas of first coils, which are arranged in slots each formed between adjacent teeth corresponding to the first tooth pitch angles $\alpha 1$ in the cross-section perpendicular to the rotation axis.

20 Claims, 5 Drawing Sheets

(51) Int. Cl.
*H02K 1/16* (2006.01)
*H02K 3/28* (2006.01)
*H02K 5/20* (2006.01)

(56) References Cited

FOREIGN PATENT DOCUMENTS

| | | |
|---|---|---|
| JP | 2006-50791 A | 2/2006 |
| JP | 2006-353013 A | 12/2006 |
| JP | 2010-136459 A | 6/2010 |

OTHER PUBLICATIONS

International Search Report dated Jun. 5, 2018 in PCT/JP2018/008389 filed on Mar. 5, 2018.

\* cited by examiner

ROTARY ELECTRIC MACHINE

TECHNICAL FIELD

The present invention relates to a structure of a stator of a rotating electric machine.

BACKGROUND ART

Losses generated in rotating electric machines such as an electric motor and a generator include, for example, a copper loss, an iron loss, and a magnet eddy loss which is an eddy loss generated in magnets. For example, in a typical inner rotor type rotating electric machine, a stator includes a stator core and coils. The stator core formed of laminated sheet-shaped cores each punched out from a magnetic steel sheet. The coils are arranged on the stator core. An iron loss generated in the stator core and a copper loss generated in the coils are main losses of the stator. In a rotor with permanent magnets arranged on a rotor core, an iron loss in the rotor core and a magnet eddy loss, which is generated in the magnets, are main losses of the rotor. When the losses described above are large, temperatures of the stator and the rotor increase, with the result that, for example, burnout of the coils and demagnetization of the magnets occur. Therefore, a measure is taken to suppress an increase in temperature of the rotating electric machine by mounting a cooling device thereto.

Examples of a cooling method of cooling an electric motor and a generator with use of the cooling device employed in the above-mentioned measure include air cooling, water cooling, and oil cooling. Specifically, as a method of air cooling, there has been given a method of cooling a frame by mounting fins to a frame surface arranged on an outer peripheral surface of the stator and allowing air to pass through the fins. Further, as a method of water cooling or oil cooling, there has been given a method of cooling a frame by forming a cavity inside a frame and circulating a refrigerant such as water or oil.

For example, in a cooling structure disclosed in Patent Literature 1, a water cooling device is mounted to an outer peripheral surface of a stator. The water cooling device includes, under a state in which a rotation axis of the electric motor is horizontally oriented, an inlet for cooling water provided on a lower side in a radial direction of a cylindrical frame, a meandering water path provided in the frame, and an outlet for the cooling water provided on an upper side in the radial direction of the frame. The cooling water enters the frame through the inlet for the cooling water on the lower side in the radial direction of the frame. Then, the cooling water circulates in the water path in the frame so that the cooling water absorbs heat from the outer peripheral surface of the stator. Finally, the cooling water is discharged through the outlet for the cooling water arranged on the upper side in the radial direction of the frame.

CITATION LIST

Patent Literature

[PTL 1] JP 08-149757 A

SUMMARY OF INVENTION

Technical Problem

However, in general, cooling capacity of a water cooling device is not uniform and varies in an entire electric motor. For example, in the water cooling device disclosed in Patent Literature 1, the cooling water enters through the inlet for the cooling water on the lower side in the radial direction of the frame. Then, the cooling water absorbs heat from the stator and is discharged through the outlet for the cooling water on the upper side in the radial direction of the frame. As a result, the temperature of the cooling water increases as the cooling water proceeds toward the upper side in the radial direction of the frame. Therefore, the cooling capacity of the water cooling device is highest on the lower side in the radial direction of the frame, and is lower on the upper side in the radial direction of the frame.

A typical rotating electric machine has a structure which is substantially rotationally symmetric about a rotation axis. Therefore, a distribution of a loss in the stator, which is a sum of the copper loss generated in coils of the stator and the iron loss generated in the stator core, is substantially uniform in a rotation direction, that is, a circumferential direction. Therefore, when the stator of the rotating electric machine is cooled by the water cooling device having a distribution of the cooling performance as described above, in the stator, the temperature increase at a portion at which the cooling performance of the water cooling device is low is larger than the temperature increase at a portion at which the cooling performance of the water cooling device is high. Further, the rotating electric machine is required to be designed such that a portion at the maximum temperature does not exceed an upper temperature limit. Therefore, when the temperature of the rotating electric machine locally increases, the design of the rotating electric machine is limited by the temperature of the portion at which the temperature increases. As a result, characteristics of the rotating electric machine are locally limited, and there arises a problem in that a volume of the rotating electric machine is increased in order to improve heat dissipation. Accordingly, in order to suppress the local increase in temperature of the rotating electric machine, the loss in the stator of the rotating electric machine is required to be distributed in a cross-section perpendicular to the rotation axis of the rotating electric machine in accordance with the distribution of the cooling performance of the water cooling device.

The present invention has been made to solve the above-mentioned problem, and has an object to obtain a rotating electric machine which is capable of distributing a loss in a stator of the rotating electric machine in a cross-section perpendicular to a rotation axis of the rotating electric machine.

Solution to Problem

According to one embodiment of the present invention, there is provided a rotating electric machine, including: a rotor which is supported so as to be freely rotatable about a rotation axis; and a stator including: a yoke portion which has an annular shape and is arranged coaxially with the rotor; a plurality of teeth which protrude from the yoke portion toward the rotor side and are arranged side by side in a circumferential direction; and a plurality of coils which are accommodated in slots each formed between adjacent teeth, wherein, in a cross-section of the stator perpendicular to the rotation axis, straight lines passing through centers of the teeth in the circumferential direction and the rotation axis are defined as tooth center axes, angles formed by the tooth center axes of the adjacent teeth among the plurality of teeth are defined as tooth pitch angles, and a maximum tooth pitch angle among the tooth pitch angles is defined as a first tooth pitch angle, wherein at least one tooth pitch angles among the tooth pitch angles become smaller as proceeding from the first tooth pitch angle in a clockwise direction and a counterclockwise direction, respectively, and is defined as a second tooth pitch angle, wherein, a coil arranged in one of the slots each formed between adjacent teeth corresponding to the first tooth pitch angle is defined as a first coil, and a coil arranged in another of the slots each formed between adjacent teeth corresponding to the second tooth pitch angle is defined as a second coil, and wherein a cross-sectional area of the second coil in a cross-section perpendicular to the rotation axis is smaller than a cross-sectional area of the first coil in the cross-section perpendicular to the rotation axis.

Advantageous Effects of Invention

The rotating electric machine having the configuration described above is capable of distributing a loss in the stator in the cross-section perpendicular to the rotation axis of the rotating electric machine.

DESCRIPTION OF EMBODIMENTS

A rotating electric machine according to exemplary embodiments of the present invention is described below with reference to the accompanying drawings.

First Embodiment

Figures 1, 2:
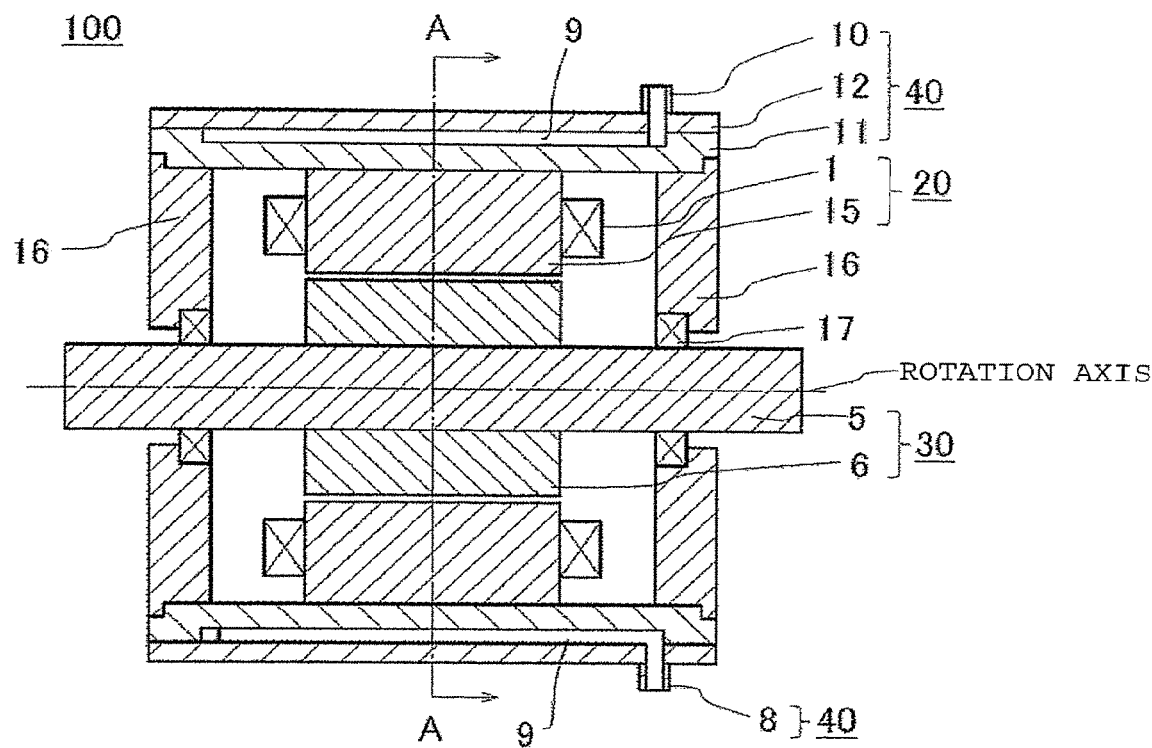
FIG. 1 is a vertical sectional view of a rotating electric machine according to a first embodiment of the present invention including a rotation axis direction.
FIG. 2 is a sectional view of the rotating electric machine according to the first embodiment of the present invention taken along the line A-A perpendicular to the rotation axis direction.

FIG. 1 is a vertical sectional view of a rotating electric machine according to a first embodiment for implementing the present invention including a rotation axis direction. In FIG. 1, a rotating electric machine 100 includes an inner frame 11, an outer frame 12, brackets 16, a rotor 30, and a stator 20. The inner frame 11 has, on an outer peripheral surface thereof, a groove for allowing a refrigerant to pass thereon. The outer frame 12 is mounted to the outer peripheral surface of the inner frame 11. The brackets 16 are arranged at both end surfaces of the inner frame 11 in a rotation axis direction and hold bearings 17 on a radially inner side. The rotor 30 includes a shaft 5 and a plurality of permanent magnets 6 fixed to an outer periphery of the shaft 5, and is supported so as to be freely rotatable about a rotation axis of the shaft 5 through intermediation of the bearings 17. The stator 20 is fixed to an inner periphery of the inner frame 11 and is arranged on a radially outer side of the rotor 30 with a gap.

Figure 3:
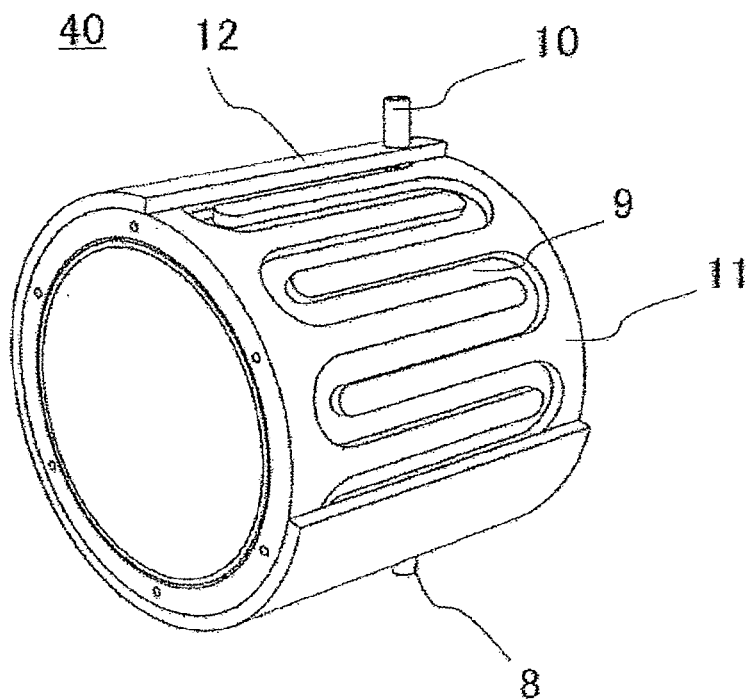
FIG. 3 is a perspective view of a cooling device of the first embodiment of the present invention.

FIG. 3 is a sectional view of the rotating electric machine according to the first embodiment for implementing the present invention taken along the line A-A perpendicular to the rotation axis direction. The stator 20 includes a core back 14, a plurality of teeth 2, and a plurality of coils 1. The core back 14 is a yoke portion which has an annular shape and is arranged coaxially with the rotor 30. The plurality of teeth 2 protrude from the yoke portion toward the rotor 30 side and are arranged side by side in a circumferential direction. The plurality of coils 1 are accommodated in slots 13 each formed between adjacent teeth 2. A stator core 15 includes the core back 14 and the six teeth 2.

In FIG. 2, the six teeth 2 are denoted by reference symbols 2b, 2c, 2d, 2e, and 2f in a clockwise order from a tooth 2a having a coil 1 of V1 phase wound therearound as a reference. Each of six, that is, the plurality of teeth 2 includes a base portion 4. The base portion 4 protrudes from the core back 14 being the yoke portion toward the rotor 30 side, and has a distal end portion 3 at a distal end in a direction toward the rotor 30 side. The distal end portion 3 forms a flange portion which protrudes from the base portion 4 in the circumferential direction. Further, distances in the circumferential direction each defined between one end of both ends of the distal end portion 3 of one tooth 2 in the circumferential direction and another end of both ends of the distal end portion 3 of another tooth 2 in the circumferential direction, which is adjacent to the one end of the both ends of the distal end portion 3 of the one tooth 2 in the circumferential direction, are all equal. Widths of the distal end portions 3 of the six, that is, the plurality of teeth 2 in the circumferential direction are all equal. Side surfaces of the distal end portion 3 in the circumferential direction may be surfaces continuous with side surfaces of the base portion 4 in the circumferential direction, and it is not always required that the flange portion protrude from the base portion 4.

The stator core 15 is formed of a plurality of sheet-shaped stator cores laminated in the rotation axis direction, which are punched out in a shape of the core back 14 and the teeth 2 of FIG. 2 from electromagnetic steel plates each having a thickness of 0.35 mm. The plurality of sheet-shaped stator cores are bonded to be fixed to each other in the rotation axis direction with an adhesive. The plurality of sheet-shaped stator cores may be fixed in the rotation axis direction by caulking, laser welding, or the like.

Further, the stator core 15 may be manufactured with a lump of a bulk magnetic material or powder cores other than electromagnetic steel plates. In this embodiment, the sheet-shaped stator core is punched out from the electromagnetic steel plate as a single piece integrally including the core back 14 and the teeth 2. The sheet-shaped stator core may be one-tooth core which is punched out so that the core back 14 is separated in the circumferential direction for each tooth 2. Further, the stator core 15 may have a structure in which the core back 14 is rotatable in a plane perpendicular to the rotation axis for each tooth 2.

The number of coils 1 is six in total, in which two coils are provided for each of three phases. Each of the six coils 1 is wound by concentrated winding of winding one coil around each tooth 2, and one coil is wound around each of the six teeth 2. A magnet wire, which is a round conductive wire, is wound around the tooth 2 by a predetermined number of windings through intermediation of an insulator (not shown) to form the coil 1. The coils 1 are subjected to a varnish treatment after being wound around the teeth 2 to be fixed to the teeth 2. The phases of the coils 1 are arranged in the order of V1, W1, U2, V2, W2, and U1 counterclockwise from the tooth 2a as a reference in the cross-section of FIG. 2. When currents in the same direction flow through the coils 1, directions of electromagnetic fields generated in the coils 1 are oriented in the same directions in the radial direction. As a result, the coils 1 of the same phase are arranged at positions of 180° rotational symmetry. For example, the coils 1 of U1 phase and U2 phase are arranged at positions opposed to each other. Further, the plurality of coils 1 include two, that is, a plurality of phase coils through which a current of one phase flows, specifically, phase coils U1 and U2, phase coils V1 and V2, and phase coils W1 and W2. The plurality of phase coils through which a current of one phase flows, that is, the phase coils U1 and U2, the phase coils V1 and V2, and the phase coils W1 and W2 are connected in series, respectively. In a case in which the number of coils of the same phase is large, as long as the phase coils have a configuration in which resistance of each phase becomes the same, the phase coils may be connected in parallel connection or in a combination of serial and parallel connections, other than the connection in series.

An arrangement of the coils 1 may be different from the arrangement of the coils 1 of this embodiment depending on combinations of the number of magnetic poles and the number of slots. Further, the cross-sectional shape of the conductive wire of the coil 1 is not limited to the cross-sectional shape of the round wire, and may have a different cross-sectional shape such as that of a rectangular wire or the like. Still further, a material of the conductive wire of the coil 1 is copper in this embodiment, but may be aluminum or the like.

The rotor 30 includes the shaft 5 and cylindrical permanent magnets 6 of four poles, which serve also as a rotor core and are arranged on the outer periphery of the shaft 5. That is, the rotor 30 has a plurality of magnetic poles. In the rotor 30, the polarities of the permanent magnets 6 are arranged in the circumferential direction such that different polarities are alternately arranged. In FIG. 2, "N" indicates a polarity of an N pole which is a magnetic pole on a surface of the permanent magnet 6 on the stator 20 side, and "S" indicates a polarity of an S pole which is a magnetic pole on a surface of the permanent magnet 6 on the stator 20 side. Therefore, the rotating electric machine 100 is a surface magnet type rotating electric machine, that is, a surface permanent magnet motor (SPM motor). The rotor 30 is supported by the bearings 17 so as to rotate with respect to the inner frame 11, the outer frame 12, and the stator 20. In this embodiment, a material of the permanent magnets 6 is a ferrite magnet.

The rotor 30 may be a rotor of an embedded magnet type, in which the permanent magnets 6 are embedded in the rotor core, that is, an interior permanent magnet motor (IPM motor). Further, the rotor 30 may be a rotor having other configuration, such as a rotor having a field winding therein or a rotor of an induction machine, that is, an induction motor (IM). In the rotating electric machine 100 according to this embodiment, the material of the permanent magnets 6 is a ferrite magnet, but may be other hard magnetic material such as a neodymium sintered magnet.

The number of magnetic poles of the rotating electric machine 100 is four, and the number of slots 13, that is, the number of teeth 2 is six. That is, a magnetic structure of the rotating electric machine 100 has a structure of 4-poles and 6-slots. Further, the rotating electric machine 100 has a magnetic structure in which a structure of 2-poles and 3-slots is repeated two times in the circumferential direction. That is, the magnetic structure of the rotating electric machine 100 has a structure in two-times rotational symmetry in the circumferential direction, that is, in the rotation direction.

In a cross-section of the stator 20 perpendicular to the rotation axis, straight lines passing through centers of the teeth 2 in the circumferential direction and the rotation axis of the shaft 5 are defined as tooth center axes, and angles formed by the tooth center axes of adjacent teeth 2 among the plurality of teeth 2 are defined as tooth pitch angles $\alpha 1$, $\alpha 2$, and $\alpha 3$. The tooth pitch angles $\alpha 1$ are angles formed by tooth center axes of the teeth 2f and 2a, and tooth center axes of the teeth 2a and 2b. The tooth pitch angles $\alpha 2$ are angles formed by tooth center axes of the teeth 2b and 2c, and tooth center axes of the teeth 2f and 2e. The tooth pitch angles $\alpha 3$ are angles formed by the tooth center axes of the teeth 2c and 2d, and tooth center axes of the teeth 2e and 2d. The tooth pitch angles are set to $\alpha 1=64°$, $\alpha 2=60°$, and $\alpha 3=56°$.

Further, the greatest common divisor between 4, which is the number of the plurality of magnetic poles, and 6, which is the number of the plurality of teeth 2, is 2. In the cross-section of the stator 20 perpendicular to the rotation axis, the tooth pitch angles $\alpha 1$ are continuous by two in a clockwise direction or a counterclockwise direction. The number "2" is obtained by dividing 6 being the number of plurality of teeth by 2 being the greatest common divisor and subtracting 1 from 3 being a quotient of the division. Further, the tooth pitch angles $\alpha 3$ are continuous by two in the clockwise direction or the counterclockwise direction in a similar manner. The tooth pitch angles $\alpha 1$ being continuous by two in the clockwise direction or the counterclockwise direction are equal to each other. Further, the tooth pitch angles $\alpha 3$ being continuous by two in the clockwise direction or the counterclockwise direction are equal to each other.

With this configuration, distributions of a magnetic flux flowing through the teeth 2f, 2a, and 2b, and a magnetic flux flowing through the teeth 2c, 2d, and 2e, which form a magnetic unit, have equal intervals in the circumferential direction in the magnetic unit, and hence torque pulsations and the like, which are caused by an uneven distribution in the circumferential direction in the magnetic unit, are suppressed.

The tooth center axis of the tooth 2a having the coil 1 of V1 phase wound therearound is defined as a reference 7 among the three teeth 2a, 2b, and 2f, which have the coils 1 of phases of U1, V1, and W1 wound therearound and are continuous in one of the circumferential directions of two-times rotational symmetry. The tooth pitch angles become smaller in the clockwise direction and the counterclockwise direction with respect to the reference 7.

Therefore, maximum tooth pitch angles $\alpha 1$ are defined as first tooth pitch angles $\alpha 1$. On this occasion, at least one of the tooth pitch angles $\alpha 2$ and $\alpha 3$ become smaller than the first tooth pitch angles $\alpha 1$ as proceeding from the first tooth pitch angles $\alpha 1$ in the clockwise direction and the counterclockwise direction, respectively. Such tooth pitch angles are defined as second tooth pitch angles.

Widths of the base portions 4 of the teeth 2a to 2f in the circumferential direction are all equal. Therefore, cross-sectional areas of the slots 13 formed between adjacent teeth 2 in a cross-section perpendicular to the rotation axis also become smaller as proceeding from the reference 7 in the clockwise direction and the counterclockwise direction. Further, cross-sectional areas of the coils 1, which are wound around the teeth 2 by concentrated winding, in the cross-section perpendicular to the rotation axis are equal on both sides of the teeth 2 in the circumferential direction. Therefore, cross-sectional areas of the coils 1 of phases U2, V2, and W2 in the cross-section perpendicular to the rotation axis become smaller than cross-sectional areas of the coils 1 of phases U1, V1, and W1 in the cross-section perpendicular to the rotation axis. Further, cross-sectional areas of the coils 1 of phases U1, V1, and W1 in the cross-section perpendicular to the rotation axis are equal to each other, and cross-sectional areas of the coils 1 of phases U2, V2, and W2 in the cross section perpendicular to the rotation axis are equal to each other.

Therefore, the coils 1 of phases U1, V1, and W1, which are arranged in the slots 13 formed between adjacent teeth 2a and 2b and between adjacent teeth 2a and 2f corresponding to the first tooth pitch angles α1, are defined as first coils 1a. Further, the coils 1 of phases U2, V2, and W2, which are arranged in the slots 13 formed between adjacent teeth 2c and 2d and between adjacent 2d and 2e corresponding to the second tooth pitch angles α3, are defined as second coils 1b. The first coils 1a and the second coils 1b are arranged in the respective slots 13 formed between adjacent teeth 2b and 2c and between adjacent teeth 2e and 2f corresponding to the tooth pitch angles α2. Cross-sectional areas of the second coils 1b in a cross-section perpendicular to the rotation axis are smaller than cross-sectional areas of the first coils 1a in a cross-section perpendicular to the rotation axis.

Further, the number of windings of each of the coils 1 is equal. Therefore, the cross-sectional areas of the conductive wires in a cross-section perpendicular to the rotation axis are small in accordance with sizes of the cross-sectional areas of the coils 1 in the cross-section perpendicular to the rotation axis. That is, each of the plurality of coils 1 has the conductive wire wound around the tooth 2, and the cross-sectional area of the conductive wire of the second coil 1b in a cross-section perpendicular to the rotation axis is smaller than the cross-sectional area of the conductive wire of the first coil 1a in the cross-section perpendicular to the rotation axis. Further, a wire diameter of the conductive wire also becomes smaller in accordance with the sizes of the cross-sectional areas of the coils 1 in the cross-section perpendicular to the rotation axis.

A coil space factor, which is a ratio of the cross-sectional areas of the coils 1 in the cross-section perpendicular to the rotation axis to the cross-sectional areas of the slots 13 in which each coil 1 is mounted, is assumed to be the same. The cross-sectional areas of the coils 1 in the cross section perpendicular to the rotation axis are symmetric with respect to the reference 7 in the cross-section of FIG. 2. In such a configuration, resistance of the first coils 1a which are coils 1 of phases U1, V1, and W1 is smaller than resistance of the second coils 1b which are coils 1 of phases U2, V2, and W2. The coils 1 of the same phase, that is, the coils 1 of phases U1 and U2 are connected in series, the coils 1 of phases V1 and V2 are connected in series, and the coils 1 of phases W1 and W2 are connected in series. Therefore, resistance of the coils 1 of U phase, resistance of the coils 1 of V phase, and resistance of the coils 1 of W phase, which are resistance of the coils 1 of each phase, are equal to each other. Further, the currents flowing through respective phases are applied at the same magnitude to the coils 1, and hence copper loss in phases U1, V1, and W1 generated in the first coils 1a becomes smaller than copper loss in phases U2, V2, and W2 generated in the second coils 1b. In other words, in FIG. 2, the copper loss generated in the first coils 1a occupying about half of an upper portion of the stator 20 in a radial direction become smaller than the copper loss generated in the second coils 1b occupying about half of a lower portion of the stator 20 in the radial direction.

Further, the magnitude of the currents flowing through coils 1 of respective phases is the same, and hence the torque pulsation caused by variations of the magnitude of the currents is suppressed.

Further, the widths of the teeth 2 in the circumferential direction are all equal, and the coil space factor of the coils 1 in each of the slots 13 is also equal. Therefore, a sum of the cross-sectional areas of all the coils 1 of the stator 20 in the cross-section perpendicular to the rotation axis is equal to a sum of the cross-sectional areas of the coils 1 in the cross-section perpendicular to the rotation axis in a configuration in which the tooth pitch angles α1, α2, and α3 are all equal. Therefore, when the currents applied to the coils 1 are the same, a sum of the copper loss generated in the coils 1 is equal to a sum of the copper loss generated in the coils 1 in the configuration in which the tooth pitch angles α1, α2, and α3 are all equal. That is, the tooth pitch angles α1, α2, and α3 are shifted in the circumferential direction to have the same sum, and hence the copper loss generated in the coils 1 in the circumferential direction is distributed without changing the sum of the copper loss generated in the coils 1.

Further, the teeth 2 has a configuration such that the tooth pitch angles α1, α2, and α3 vary, but only the base portions 4 of the teeth 2 are shifted in the circumferential direction. Therefore, distances in the circumferential direction each defined between one end of both ends of the distal end portion 3 of one tooth 2 in the circumferential direction and another end of both ends of distal end portion 3 of another tooth 2 in the circumferential direction, which is adjacent to the one end of the both ends of the distal end portion 3 of the one tooth 2 in the circumferential direction, are all equal. Further, widths of the distal end portions 3 of the six teeth 2 in the circumferential direction are all equal.

With such a configuration, it is possible to prevent occurrence of magnetic imbalance due to shift of the distal end portions 3 in the circumferential direction along with the shift of the distal end portions 4 of the teeth 2 in the circumferential direction, and resulting collapse of the repetition of the magnetic structure of the rotating electric machine 100. Further, it is possible to prevent occurrence of deterioration in characteristics of the rotating electric machine 100, such as an increase in torque pulsations caused by the magnetic imbalance. In FIG. 2, a distal end portion of the tooth 2a serving as the reference of the shift of the teeth 2 and a distal end portion of the tooth 2d at a position opposed to the tooth 2a are symmetric to respective tooth center axes. Meanwhile, distal end portions of another teeth 2b, 2c, 2e, and 2f are asymmetric to respective tooth center axes.

In an application of a rotating electric machine having less influence of torque pulsations or the like, not only the teeth 2 in this embodiment but also the distal end portions 3 may be shifted in the circumferential direction in accordance with the teeth.

In a case of the one-tooth core which is punched out so that the core back 14 is separated circumferential positions each located between adjacent teeth 2, a material of one-tooth core on a lower side of the stator 20 in the radial direction may be changed to a material of a grade with an iron loss larger than a material of another one-tooth core. In this case, efficiency of the rotating electric machine 10 is slightly decreased. Meanwhile, when a temperature increase falls within an allowable range, cost reduction can be achieved by changing the material of the one-tooth core.

In the following, a cooling device used for cooling the rotating electric machine 100 is described. FIG. 3 is a perspective view of the cooling device of the present embodiment. In FIG. 3, when the rotating electric machine 100 according to this embodiment is used, a cooling device 40 is mounted to the outer peripheral surface of the stator 20. The cooling device 40 includes the inner frame 11 arranged on the outer peripheral surface of the stator 20, and the outer frame 12 mounted to the outer peripheral surface of the inner frame 11. The inner frame 11 which is arranged on the outer peripheral surface of the stator 20 has, on the outer peripheral surface thereof, a groove for allowing cooling water being a refrigerant to pass thereon. The outer frame 12 is mounted to the outer peripheral surface of the inner frame 11. On a contact surface between the inner frame 11 and the outer frame 12, an O-ring (not shown) or the like is mounted to prevent the cooling water from leaking. A flow path 9 for the refrigerant is formed between the groove of the inner frame 11 and the inner peripheral surface of the outer frame 12. An inlet 8 for allowing the cooling water to flow thereinto from an outside and flow out to the flow path 9 is provided at a lower portion of the outer frame 12 in the radial direction. An outlet 10 for allowing the cooling water to flow thereinto from the flow path 9 to be discharged to the outside is provided at an upper portion of the outer frame 12 in the radial direction. Therefore, the cooling water flows in from the inlet 8 at the lower portion of the rotating electric machine 100 in the radial direction, and flows through the flow path 9 which is divided from the inlet 8 toward both sides of the inner frame 11 in the circumferential direction to meander. Then, the cooling water flows out from the outlet 10 at the upper portion of the rotating electric machine 100 in the radial direction while absorbing heat from the inner frame 11 having the stator 20 fixed thereto.

In this embodiment, as illustrated in FIG. 2, the cooling device 40 is mounted to the rotating electric machine 100. That is, the inlet 8 for the cooling water of the cooling device 40 is arranged at the same circumferential position as the coils 1 which generate a large copper loss, that is, the second coils 1b. That is, a second cooling portion 42, which is a portion surrounded by a two-dot chain line in a range from the inlet 8 for the cooling water of the cooling device 40 to the same circumferential positions as the circumferential positions of the second coils 1b, cools the second coils 1b. The outlet 10 for the cooling water of the cooling device 40 is arranged at the same circumferential positions of the coils 1 which generate a less copper loss than the second coils 1b, that is, the first coils 1a. That is, a first cooling portion 41, which is a portion surrounded by a two-dot chain line in a range from the outlet 10 for the cooling water of the cooling device 40 to the same circumferential positions as the circumferential positions of the first coils 1a, cools the first coils 1a.

With such a configuration, the circumferential positions of the second coils 1b, which generate a large copper loss, are set at the circumferential position of the inlet 8 at which cooling performance of the cooling device 40 is high. Therefore, it is possible to distribute the copper loss in the rotating electric machine 100 in the circumferential direction in accordance with the circumferential distribution of the cooling performance of the cooling device 40. That is, the cooling device 40 includes the first cooling portion 41 configured to cool the first coils 1a and the second cooling portion 42 configured to cool the second coils 1b. The cooling performance of the second cooling portion 42 is higher than the cooling performance of the first cooling portion 41.

Further, with the configuration described above, the rotating electric machine 100 can distribute the copper loss in the stator 20 from the second coils 1b at one portions toward the first coils 1a at another portions, in a cross-section of the rotating electric machine 100 perpendicular to the rotation axis, in the clockwise direction which is one direction of the circumferential direction and in the counterclockwise direction which is another direction of the circumferential direction. Therefore, as compared to a rotating electric machine which has the same tooth pitch angles and has no distribution of the copper loss in the circumferential direction, cooling can be performed more efficiently, and hence an increase in temperature of the rotating electric machine 100 can be suppressed. Further, a sum of the copper loss in the rotating electric machine 100 becomes the same as a sum of the copper loss in the rotating electric machine in which tooth pitch angles are all equal. Therefore, there is no occurrence of deterioration in efficiency of the rotating electric machine 100. Thus, it is possible to suppress a local increase in temperature of the rotating electric machine 100 while maintaining the efficiency of the rotating electric machine 100. Therefore, it is possible to suppress local limitation on characteristics of the rotating electric machine 100 and an increase in volume of the rotating electric machine 100 for improvement of heat dissipation. That is, there is no need to change an outer diameter of the stator by forming differences in the cross-sectional areas of the coils through adjustment of the tooth pitch angles. Further, it is possible to suppress the limitation on a degree of freedom in design of the rotating electric machine 100.

Figure 4:
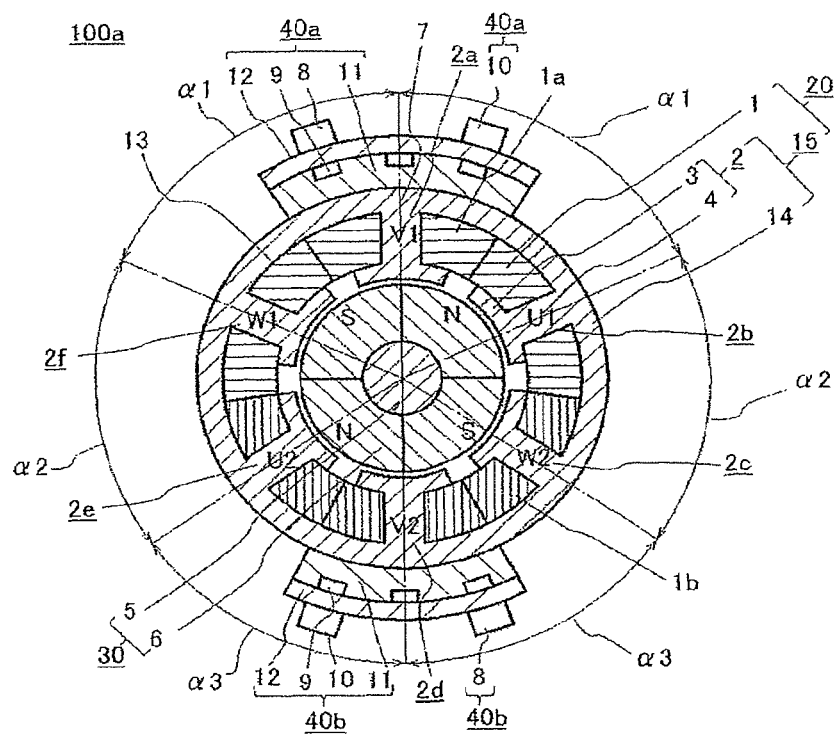
FIG. 4 is a sectional view of the rotating electric machine according to the first embodiment of the present invention taken perpendicular to the rotation axis direction in a modification example.

In this embodiment, description has been made of the case in which the cooling performance of one cooling device 40 is distributed. However, a plurality of cooling devices having different cooling performance may be arranged on the outer periphery of the stator 20. FIG. 4 is a sectional view of a rotating electric machine according to this embodiment taken perpendicular to a rotation axis direction in a modification example. In FIG. 4, a rotating electric machine 100a includes a first cooling device 40a configured to cool the first coils 1a and a second cooling device 40b configured to cool the second coils 1a. The first cooling device 40a is in a range of the same circumferential position as the circumferential position of one first coil 1a wound around the tooth 2a. The second cooling device 40b is in a range from the inlet 8 for the cooling water of the cooling device 40 to the same circumferential position as a circumferential position of one second coil 1b wound around a tooth 2d. Cooling performance of the second cooling device 40b is higher than cooling performance of the first cooling device 40a.

A distribution of the copper loss in the rotating electric machine 100a is determined based on an amount of shift of the base portions 4 of the teeth 2 in the circumferential direction. Therefore, it is desired that the distribution of the copper loss in the rotating electric machine 100a be designed in which the amount of the shift of the base portions 4 of the teeth 2 in the circumferential direction is adjusted such that the copper loss can be absorbed by the distributions of the cooling performance of the cooling devices 40, 40a, and 40b to be used.

The arrangement of the cooling devices 40, 40a, and 40b of this embodiment is such that the cooling devices 40, 40a, and 40b are arranged on the outer peripheral surface of the stator 20. Meanwhile, in addition to the cooling devices 40, 40a, and 40b of this embodiment, when a cooling method of oil cooling, in which oil circulates inside the rotating electric machines 100 and 100a for cooling, is used, the oil is reserved in the gravity direction at lower portions inside the rotating electric machines 100 and 100a in the radial direction. Therefore, the cooling performance at the lower portions of the rotating electric machines 100 and 100a in the radial direction is improved. Accordingly, in order to further improve the cooling performance at the lower portions of the rotating electric machines 100 and 100a in the radial direction, it is desired that the distributions of the copper loss in the rotating electric machines 100 and 100a be further shifted to the lower portions in the radial direction by increasing the amount of the shift of the base portions 4 of the teeth 2 in the circumferential direction, that is, by increasing differences among the tooth pitch angles α1, α2, and α3.

Ranges of the cooling devices 40, 40a, and 40b in the circumferential direction are not required to match ranges of the first coils 1a and the second coils 1b in the circumferential direction. For example, a circumferential center portion of the first cooling portion 41 or the first cooling device 40a is only required to be provided near a circumferential center portion of the first coil 1a, and a circumferential range of the first cooling portion 41 or the first cooling device 40a may be different from the circumferential range of the first coil 1a. In this embodiment, the groove for allowing the cooling water being a refrigerant to pass thereon is formed, but a large space may be defined in place of the groove. Further, as a cooling method for the cooling devices 40, 40a, and 40b, the water cooling method with oil or water has been described, but an air cooling method may be employed. The air cooling method may be forced air cooling by blowing air with use of a fan or the like, or natural cooling with use of air convection. In this case, cooling capacity may change depending on a difference in an amount of blowing air, a size of fins, or the like.

Further, the distributions of the loss in the rotating electric machines 100 and 100a are not limited to the distributions of the copper loss, and may include distributions of an iron loss or a stray loss in the stator 20.

A winding method of conductive wires in this embodiment is described. Conductive wires having different wire diameters are wound around the coils 1 of the stators 20 of the rotating electric machines 100 and 100a according to this embodiment. That is, the wire diameter of the second coil 1b is smaller than the wire diameter of the first coil 1a. Meanwhile, the wire diameter of the conductive wire can be changed adjustment of elongation of the conductive wire by changing a tension as a tensile force applied to the conductive wire at the time of winding the conductive wire. Thus, the cross-sectional area of the conductive wire can be changed about 10% by changing the tension applied to the conductive wire. Therefore, when the difference of about 10% is set for distribution, the cross-sectional area of the conductive wire may be changed by changing the tension applied to the conductive wire. An advantage of this method is that a conductive wire having the same specifications of the wire diameter can be used, and hence there is no need to prepare conductive wires having a plurality of wire diameters and the wire diameter can be changed without replacing to a conductive wire having a different wire diameter during a winding process. In particular, with the latter advantage, coils 1 having the same phase can be wound continuously, and connection points of the conductive wires can be reduced. Further, significant adjustment of a winding machine is not required, and the stator 20 can be manufactured without complication of manufacturing processes of the stator 20 including the winding process.

Further, in a case in which one-tooth cores are used for the stator core 15, through employment of a method of leading out lead wires of the coils 1 toward the same side of the coils 1 in the rotation axis direction after winding and then connecting the lead wires with connection plates or by welding, conductive wires having different wire diameters can be easily connected. When the wire diameter of the conductive wires used for the one-tooth cores needs to be significantly changed, the connection method described above is a useful manufacturing method.

Further, instead of changing the wire diameter of the conductive wires, there is a method of parallel winding of bundling conductive wires in parallel and winding the conductive wires. This method of parallel winding is a method of connecting two thin conductive wires each having a small wire diameter in parallel and winding the conductive wires as a single conductive wire instead of winding a single thick conductive wire having a large wire diameter. In the case of employing this method, resistance of the two thin conductive wires and resistance of the one thick conductive wire are required to be set equal by setting a total cross-sectional area of the two thin conductive wires and a cross-sectional area of the one thick conductive wire to be equal. When the two thin conductive wires are wound, bending radii of the conductive wires can be smaller than a case in which the one thick conductive wire is wound, and hence a winding operation is easily performed. Therefore, the coil space factor of the coils 1 in each slot 13 is improved, and there is an advantage of reducing the resistance of the coils 1. Meanwhile, in some cases, the coil space factor of the coils 1 in each slot 13 is decreased due to an influence of setting the total cross-sectional area of the two thin conductive wires and the cross-sectional area of the one thick conductive wire to be equal. Therefore, it is required that a comprehensive consideration be made.

Second Embodiment

Figure 5:
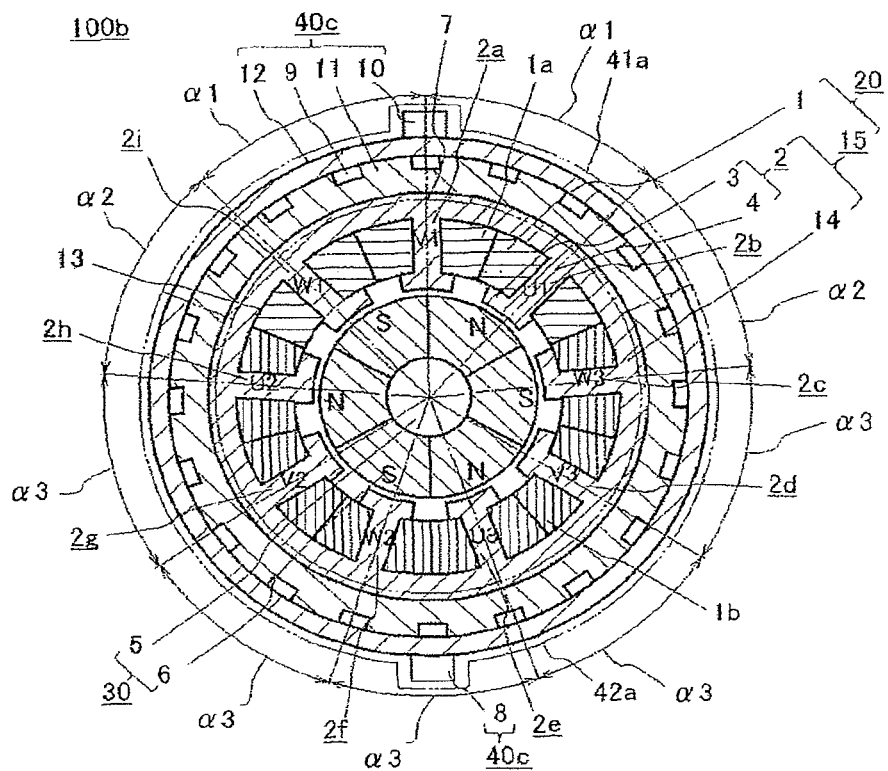
FIG. 5 is a sectional view of a rotating electric machine according to a second embodiment of the present invention taken perpendicular to a rotation axis direction.

FIG. 5 is a sectional view of a rotating electric machine according to a second embodiment for implementing the present invention taken perpendicular to a rotation axis direction. A configuration of a rotating electric machine 100b according to this embodiment is different from the first embodiment in the following points. In FIG. 5, the number of magnetic poles is six, and the number of slots 13 is nine. In FIG. 5, the nine teeth 2 are denoted by reference symbols 2b, 2c, 2d, 2e, 2f, 2g, 2h, and 2i in a clockwise from a reference 7 being a tooth center axis of a tooth 2a having a coil 1 of V1 phase wound therearound. Then, phases of the nine coils 1 wound around the teeth 2a to 2i, respectively, are arranged in the order of V1, W1, U2, V2, W2, U3, V3, W3, and U1 counterclockwise from the tooth 2a being the reference 7 in the cross-section of FIG. 5. That is, the rotating electric machine 100b according to this embodiment has a structure in which sets of the two magnetic poles and the three slots as in the first embodiment are repeated three times in the circumferential direction. The phases of coils 1 include phases of the coils 1 of a first set of U1, V1, and W1, phases of the coils 1 of a second set of U2, V2, and W2, and phases of the coils 1 of a third set of U3, V3, and W3. Thus, the magnetic structure of the rotating electric machine 100b has a structure in three-times rotational symmetry in the circumferential direction, that is, in the rotation direction.

Angles formed by tooth center axes of adjacent teeth 2 among the plurality of teeth 2 are defined as tooth pitch angles $\alpha 1$, $\alpha 2$, and $\alpha 3$. The tooth pitch angles $\alpha 1$ are angles formed by tooth center axes of the teeth 2i and 2a, and tooth center axes of the teeth 2a and 2b. The tooth pitch angles $\alpha 2$ are angles formed by tooth center axes of the teeth 2b and 2c, and tooth center axes of the teeth 2h and 2i. The tooth pitch angles $\alpha 3$ are angles formed by tooth center axes of the teeth 2c and 2d, tooth center axes of the teeth 2d and 2e, tooth center axes of the teeth 2e and 2f, tooth center axes of the teeth 2f and 2g, and tooth center axes of the teeth 2g and 2h. The tooth pitch angles are set to $\alpha 1 = 44°$, $\alpha 2 = 41°$, and $\alpha 3 = 38°$.

The tooth pitch angles become smaller in the clockwise direction and the counterclockwise direction with respect to the reference 7. Therefore, maximum tooth pitch angles $\alpha 1$ are defined as first tooth pitch angles $\alpha 1$. On this occasion, at least one of the tooth pitch angles $\alpha 2$ and $\alpha 3$ become smaller than the first tooth pitch angles $\alpha 1$ as proceeding from the first tooth pitch angles $\alpha 1$ in the clockwise direction and the counterclockwise direction, respectively. Such tooth pitch angles are defined as second tooth pitch angles.

Further, the greatest common divisor between 6, which is the number of the plurality of magnetic poles, and 9, which is the number of the plurality of teeth 2, is 3. In the cross-section of the stator 20 perpendicular to the rotation axis, the tooth pitch angles $\alpha 1$ are continuous by two in the clockwise direction or the counterclockwise direction. The number "2" is obtained by dividing 9 being the number of plurality of teeth by 3 being the greatest common divisor and subtracting 1 from 3 being a quotient of the division. Further, the tooth pitch angles $\alpha 1$ continuous by two in the clockwise direction or the counterclockwise direction are equal to each other.

Widths of the teeth 2a to 2i in the circumferential direction are all equal. Therefore, cross-sectional areas of the slots 13 formed between adjacent teeth 2 in a cross-section perpendicular to the rotation axis also become smaller as proceeding from the reference 7 in the clockwise direction and the counterclockwise direction. Further, cross-sectional areas of the coils 1 of phases of the second set U2, V2, and W2, and the third set U3, V3, and W3 in the cross-section perpendicular to the rotation axis become smaller than cross-sectional areas of the coils 1 of phases of the first set U1, V1, W1 in the cross-section perpendicular to the rotation axis. Still further, the cross-sectional areas of the coils 1 of phases of the first set U1, V1, and W1 in the cross-section perpendicular to the rotation axis are equal to each other. The cross-sectional areas of the coils 1 of phases of the second set U2, V2, and W2 and the third set U3, V3, and W3 in the cross-section perpendicular to the rotation axis are equal to each other.

In the rotating electric machine 100b of this embodiment, the cross-sectional areas of the coils 1 in the cross-section perpendicular to the rotation axis are symmetric with respect to the reference 7. The coils 1 of phases of the first set U1, V1, and W1, which are arranged in the slots 13 formed between adjacent teeth 2a and 2b and between 2a and 2i corresponding to the first tooth pitch angles $\alpha 1$, are defined as first coils 1a. Further, the coils 1 of phases of the second set U2, V2, and W2 and the third set U3, V3, and W3, which are arranged in the slots 13 formed between adjacent teeth 2c and 2d, between 2d and 2e, between 2e and 2f, between 2f and 2g, and between 2g and 2h corresponding to the second tooth pitch angles $\alpha 3$, are defined as second coils 1b.

The first coils 1a and the second coils 1b are arranged in the respective slots 13 formed between adjacent teeth 2b and 2c and between 2h and 2i corresponding to the tooth pitch angles $\alpha 2$. Cross-sectional areas of the second coils 1b in a cross-section perpendicular to the rotation axis are smaller than cross-sectional areas of the first coils 1a in a cross-section perpendicular to the rotation axis.

Further, the number of windings of each of the coils 1 is equal. Therefore, the cross-sectional areas of the conductive wires in a cross-section perpendicular to the rotation axis are small in accordance with sizes of the cross-sectional areas of the coils 1 in the cross-section perpendicular to the rotation axis. That is, each of the plurality of coils 1 has the conductive wire wound around the tooth 2, and the cross-sectional area of the conductive wire of the second coil 1b in a cross-section perpendicular to the rotation axis is smaller than the cross-sectional area of the conductive wire of the first coil 1a in the cross-section perpendicular to the rotation axis. Further, a wire diameter of the conductive wire also becomes smaller in accordance with the sizes of the cross-sectional areas of the coils 1 in the cross-section perpendicular to the rotation axis.

Resistance of the first coils 1a which are the coils 1 of phases of the first set U1, V1, and W1 is smaller than resistance of the second coils 1b which are the coils 1 of phases of the second set U2, V2, and W2 and the third set U3, V3, and W3. Therefore, in the rotating electric machine 100b of this embodiment, the copper loss in the first coils 1a located in a circumferential range of about one-third of the upper portion of the rotating electric machine 100b in the radial direction becomes smaller than the copper loss in the second coils 1b located in a circumferential range of about two-thirds of the lower portion of the rotating electric machine 100b in the radial direction.

A second cooling portion 42a, which is a portion surrounded by a two-dot chain line in a range from the inlet 8 for the cooling water of the cooling device 40c to the same circumferential positions as the circumferential positions of the second coils 1b, cools the second coils 1b. The outlet 10 for the cooling water of the cooling device 40c is arranged at the same circumferential positions of the coils 1 which generate a less copper loss than the second coils 1b, that is, the first coils 1a. That is, a first cooling portion 41a, which is a portion surrounded by a two-dot chain line in a range from the outlet 10 for the cooling water of the cooling device 40c to the same circumferential positions as the circumferential positions of the first coils 1a, cools the first coils 1a.

With such a configuration, the circumferential positions of the second coils 1b, which generate a large copper loss, are set at the circumferential position of the inlet 8 at which cooling performance of the cooling device 40c is high. Therefore, it is possible to distribute the copper loss in the rotating electric machine 100 in the circumferential direction in accordance with the circumferential distribution of the cooling performance of the cooling device 40c. That is, the cooling device 40c includes the first cooling portion 41a configured to cool the first coils 1a and the second cooling portion 42a configured to cool the second coils 1b. The cooling performance of the second cooling portion 42a is higher than the cooling performance of the first cooling portion 41a.

Therefore, the cooling device 40c has lower cooling performance at the first cooling portion 41a located in the circumferential range of about one-third of the upper portion of the rotating electric machine 100b in the radial direction, and has higher cooling performance at the second cooling portion 42a located in the circumferential range of about two-thirds of the lower portion of the rotating electric machine 100b in the radial direction, and cooling can be performed efficiently. With such a configuration, a similar effect as the first embodiment can be attained by changing the tooth pitch angles α1, α2, and α3 in accordance with the ratio of the cooling performance distribution of the cooling device 40c in the circumferential direction.

Third Embodiment

Figure 6:
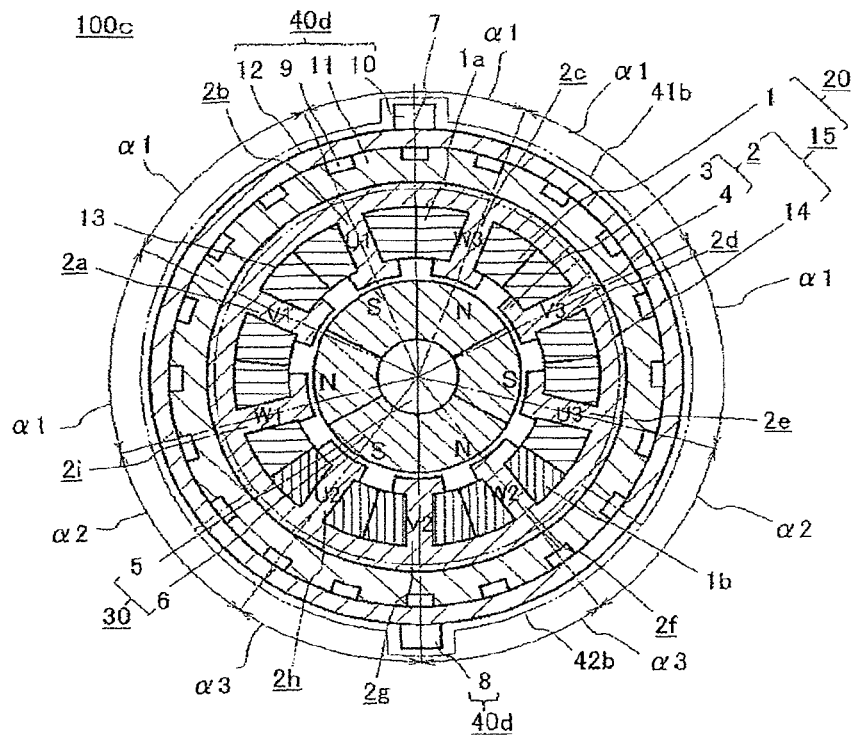
FIG. 6 is a sectional view of a rotating electric machine according to a third embodiment of the present invention taken perpendicular to a rotation axis direction.

FIG. 6 is a sectional view of a rotating electric machine according to a third embodiment for implementing the present invention taken perpendicular to a rotation axis direction. A configuration of a rotating electric machine 100c according to this embodiment is different from the second embodiment in the following points. In the rotating electric machine 100c according to this embodiment, in FIG. 6, a boundary between the coil 1 of U1 phase and the coil 1 of W3 phase arranged between the teeth 2b and 2c is set as the reference 7. Further, the first coils 1a are the coils 1 of phases of the first set U1, V1, and W1 and the third set U3, V3, and W3. The second coils 1b are the coils 1 of phases of the second set U2, V2, and W2.

A specific configuration of the rotating electric machine 100c according to this embodiment is described below. The tooth pitch angles α1 are formed by the tooth center axes of the teeth 2i and 2a, the tooth center axes of the teeth 2a and 2b, the tooth center axes of the teeth 2b and 2c, the tooth center axes of the teeth 2c and 2d, and the tooth center axes of the teeth 2d and 2e. The tooth pitch angles α2 are angles formed by the tooth center axes of the teeth 2e and 2f, and the tooth center axes of the teeth 2h and 2i. The tooth pitch angles α3 are angles formed by the tooth center axes of the teeth 2f and 2g, and the tooth center axes of the teeth 2g and 2h. The tooth pitch angles are set to α1=42°, α2=39°, and α3=36°.

The tooth pitch angles become smaller in the clockwise direction and the counterclockwise direction with respect to the reference 7. Therefore, maximum tooth pitch angles α1 are defined as first tooth pitch angles α1. On this occasion, at least one of the tooth pitch angles α2 and α3 become smaller than the first tooth pitch angles α1 as proceeding from the first tooth pitch angles α1 in the clockwise direction and the counterclockwise direction, respectively. Such tooth pitch angles are defined as second tooth pitch angles.

Further, the greatest common divisor between 6, which is the number of the plurality of magnetic poles, and 9, which is the number of the plurality of teeth 2, is 3. In the cross-section of the stator 20 perpendicular to the rotation axis, the tooth pitch angles α3 are continuous by two in the clockwise direction or the counterclockwise direction. The number "2" is obtained by dividing 9 being the number of plurality of teeth by 3 being the greatest common divisor and subtracting 1 from 3 being a quotient of the division. Further, the tooth pitch angles α3 continuous by two in the clockwise direction or the counterclockwise direction are equal to each other.

Widths of the teeth 2a to 2i in the circumferential direction are all equal. Therefore, cross-sectional areas of the slots 13 formed between adjacent teeth 2 in a cross-section perpendicular to the rotation axis also become smaller as proceeding from the reference 7 in the clockwise direction and the counterclockwise direction. Further, cross-sectional areas of the coils 1 of phases of the second set U2, V2, and W2 in the cross-section perpendicular to the rotation axis become smaller than cross-sectional areas of the coils 1 of phases of the first set U1, V1, and W1 and the third set U3, V3, and W3 in the cross-section perpendicular to the rotation axis. Still further, the cross-sectional areas of the coils 1 of phases of the second set U2, V2, and W2 in the cross-section perpendicular to the rotation axis are equal to each other, and the cross-sectional areas of the coils 1 of phases of the first set U1, V1, and W1 and the third set U3, V3, and W3 in the cross-section perpendicular to the rotation axis are equal to each other.

In the rotating electric machine 100c of this embodiment, the cross-sectional areas of the coils 1 in the cross-section perpendicular to the rotation axis are symmetric with respect to the reference 7. The coils 1 of phases of the first set U1, V1, and W1 and the third set U3, V3, and W3, which are arranged in the slots 13 formed between adjacent teeth 2i and 2a, between 2a and 2b, between 2b and 2c, between 2c and 2d, and between 2d and 2e corresponding to the first tooth pitch angles α1, are defined as first coils 1a. Further, the coils 1 of phases of the second set U2, V2, and W2, which are arranged in the slots 13 formed between adjacent teeth 2f and 2g, and between 2g and 2h corresponding to the second tooth pitch angles α3, are defined as second coils 1b. The first coils 1a and the second coils 1b are arranged in the respective slots 13 formed between adjacent teeth 2e and 2f, and between 2h and 2i corresponding to the tooth pitch angles α2. Cross-sectional areas of the second coils 1b in a cross-section perpendicular to the rotation axis are smaller than cross-sectional areas of the first coils 1a in a cross-section perpendicular to the rotation axis.

Resistance of the first coils 1a which are the coils 1 of phases of the first set U1, V1, and W1 and the coils 1 of phases of the third set U3, V3, and W3 is smaller than resistance of the second coils 1b which are the coils 1 of phases of the second set U2, V2, and W2. Therefore, in the rotating electric machine 100c of this embodiment, the copper loss in the first coils 1a which are located in a circumferential range of about two-thirds of the upper portion of the rotating electric machine 100c in the radial direction becomes smaller than the copper loss in the second coils 1b located in a circumferential range of about one-third of the lower portion of the rotating electric machine 100c in the radial direction.

A second cooling portion 42b, which is a portion surrounded by a two-dot chain line in a range from the inlet 8 for the cooling water of the cooling device 40d to the same circumferential positions as the circumferential positions of the second coils 1b, cools the second coils 1b. The outlet 10 for the cooling water of the cooling device 40d is arranged at the same circumferential positions of the coils 1 which generate a less copper loss than the second coils 1b, that is, the first coils 1a. That is, a first cooling portion 41b, which is a portion surrounded by a two-dot chain line in a range from the outlet 10 for the cooling water of the cooling device 40d to the same circumferential positions as the circumferential positions of the first coils 1a, cools the first coils 1a.

With such a configuration, the circumferential positions of the second coils 1b, which generate a large copper loss, are set at the circumferential position of the inlet 8 at which cooling performance of the cooling device 40d is high. Therefore, it is possible to distribute the copper loss in the rotating electric machine 100 in the circumferential direction in accordance with the circumferential distribution of the cooling performance of the cooling device 40d. That is, the cooling device 40d includes the first cooling portion 41b configured to cool the first coils 1a and the second cooling portion 42b configured to cool the second coils 1b. The cooling performance of the second cooling portion 42*b* is higher than the cooling performance of the first cooling portion 41*b*.

Therefore, the cooling device 40*d* has lower cooling performance at the first cooling portion 41*b* located in the circumferential range of about one-third of the upper portion of the rotating electric machine 100*b* in the radial direction, and has higher cooling performance at the second cooling portion 42*b* located in the circumferential range of about two-thirds of the lower portion of the rotating electric machine 100*b* in the radial direction, and cooling can be efficiently performed. With such a configuration, a similar effect as the first embodiment can be attained by changing the tooth pitch angles α1, α2, and α3 in accordance with the ratio of the cooling performance distribution of the cooling device 40*d* in the circumferential direction.

In a case in which the magnetic structure of the rotating electric machine 100*b* has the structure in three-times rotational symmetry in the circumferential direction as in the second and the third embodiments, the cross-sectional areas of the coils 1 in the coils 1 of phases of the first, second, and third sets in the cross-section perpendicular to the rotation axis may have a plurality of combinations. For example, the following two combinations may be adopted: a case in which the cross-sectional areas of the coils 1 in the coils 1 of phases of the first set in the cross-section perpendicular to the rotation axis are larger than the cross-sectional areas of the coils 1 in the coils 1 of phases of the second and third sets in the cross-section perpendicular to the rotation axis; and a case in which the cross-sectional areas of the coils 1 in the coils 1 of phases of the first and third sets in the cross-section perpendicular to the rotation axis are larger than the cross-sectional areas of the coils 1 in the coils 1 of phases of the second set in the cross-section perpendicular to the rotation axis.

Meanwhile, in the first embodiment, there is only one combination in which the cross-sectional areas of the coils 1 in the coils 1 of phases of the first set U1, V1, and W1 in the cross section perpendicular to the rotation the axis are larger than the cross sectional areas of the coils 1 in the coils 1 of phases of the second set U2, V2, and W2 in the cross-section perpendicular to the rotation axis. Further, third coils 3, which have smaller cross-sectional areas in the cross section perpendicular to the rotation axis than those of the first coils 1*a* and the second coils 1*b*, may be used for a combination of the cross-sectional areas in accordance with the number of magnetic poles and the number of slots. Still further, fourth coils, which have smaller cross-sectional areas in the cross section perpendicular to the rotation axis than those of the third coils, may be used. Thus, the various sizes of the cross-sectional areas and the various numbers of coils 1 having the same cross-sectional areas can be set.

Fourth Embodiment

Figure 7:
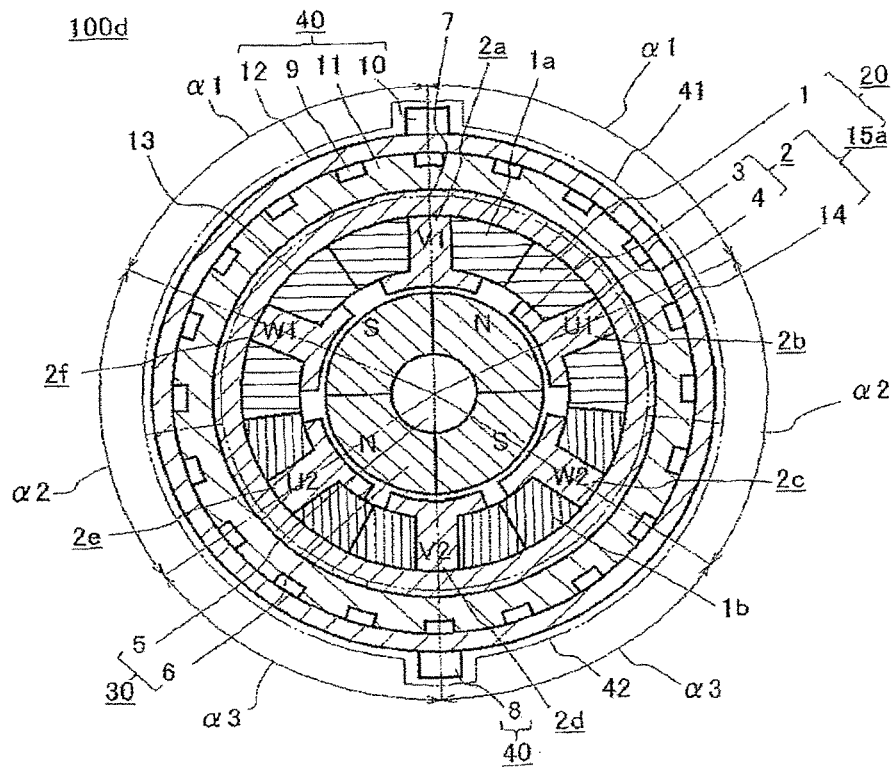
FIG. 7 is a sectional view of a rotating electric machine according to a fourth embodiment of the present invention taken perpendicular to a rotation axis direction.

FIG. 7 is a sectional view of a rotating electric machine according to a fourth embodiment for implementing the present invention taken perpendicular to a rotation axis direction. A configuration of a rotating electric machine 100*d* according to this embodiment is different from the first embodiment in the following points. In the rotating electric machine 100*d* according to this embodiment, in FIG. 7, the base portions 4 and the distal end portions 3 of the teeth 2 are shifted in the circumferential direction in accordance with change of the tooth pitch angles α1, α2, and α3 of the teeth 2. Further, widths of the distal end portions 3 of the six teeth 2 in the circumferential direction are all equal.

Therefore, distances in the circumference direction each defined between one end of both ends 3 of the distal end portion 3 of one tooth 2 in the circumferential direction and another end of both ends of the distal end portion 3 of another tooth 2 in the circumferential direction, which is adjacent to the one end of the both ends of the distal end portion 3 of the one tooth 2 in the circumferential direction, are different in apart of the rotating electric machine 100*d*. That is, a distance in the circumference direction defined between one end of both ends of the distal end portion 3 of the tooth 2*b* in the circumferential direction and another end of both ends of the distal end portion 3 of the tooth 2*c* in the circumferential direction, which is adjacent to the tooth 2*b*, is smaller than a distance in the circumferential direction between one end of both the ends of the distal end portion 3 of the tooth 2*a* in the circumferential direction and another end of the both ends of the distal end portion 3 of the tooth 2*b* in the circumferential direction, which is adjacent to the tooth 2*a*. Further, a distance in the circumference direction between one end of both ends of the distal end portion 3 of the tooth 2*c* in the circumferential direction and another end of both ends of the distal end portion 3 of the tooth 2*d* in the circumferential direction, which is adjacent to the tooth 2*c*, is smaller than a distance in the circumferential direction between the one end of the both ends of the distal end portion 3 of the tooth 2*b* in the circumferential direction and the another end of the both ends of the distal end portion 3 of the tooth 2*c* in the circumferential direction, which is adjacent to the tooth 2*b*. Further, in the rotating electric machine 100*d* of this embodiment, the distances in the circumferential direction each defined between the one end of both ends of the distal end portion 3 in the circumferential direction and the another end of the both ends of the distal end portion 3 of the teeth 2 in the circumferential direction, which is adjacent to the one end of the both ends of the distal end portion 3 in the circumferential direction, are symmetric with respect to the reference 7.

Further, a stator core 15*a* is formed by the core back 14 and the teeth 2*a* to 2*f*, which are separate members to be integrated in one piece. The distal end portions 3 of each of the teeth 2 are symmetric with respect to the tooth center axes of the teeth 2*a* to 2*f*. Therefore, the stator core 15*a* can be manufactured by adjusting circumferential positions of the teeth 2*a* to 2*f* with respect to the core back 14. Accordingly, the stator core 15*a* can be manufactured with use of the teeth 2 having the same shape. Therefore, in the rotating electric machine 100*d* according to this embodiment, the number of molds used for punching out an electromagnetic steel sheet to form the stator core 15*a* can be reduced, and hence the cost of the molds can be reduced.

Fifth Embodiment

Figure 8:
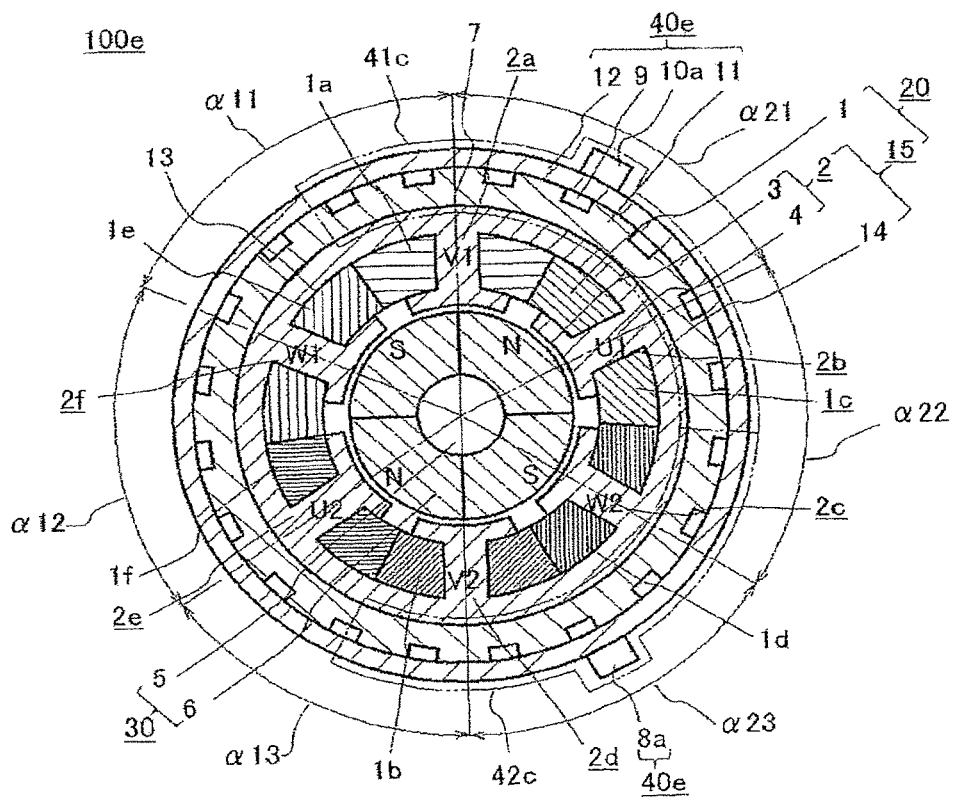
FIG. 8 is a sectional view of a rotating electric machine according to a fifth embodiment of the present invention taken perpendicular to a rotation axis direction.

FIG. 8 is a sectional view of a rotating electric machine according to a fifth embodiment for implementing the present invention taken perpendicular to a rotation axis direction. A configuration of a rotating electric machine 100*e* according to this embodiment is different from the first embodiment in the following points. In the rotating electric machine 100*e* according to this embodiment, in FIG. 8, the cross-sectional areas of the coils 1 in the cross-section perpendicular to the rotation axis are asymmetric with respect to the reference 7. That is, a tooth pitch angle α11 is an angle formed by the tooth center axes of the teeth 2*f* and 2*a*. A tooth pitch angle α12 is an angle formed by the tooth center axes of the teeth 2*e* and 2*f*. A tooth pitch angle α13 is an angle formed by the tooth center axes of the teeth 2*d* and 2e. A tooth pitch angle α21 is an angle formed by the tooth center axes of the teeth 2a and 2b. A tooth pitch angle α22 is an angle formed by the tooth center axes of the teeth 2b and 2c. A tooth pitch angle α23 is an angle formed by the tooth center axes of the teeth 2c and 2d. The tooth pitch angles are set to α11=62°, α12=60°, α13=58°, α21=63°, α22=60°, and α23=57°.

The tooth pitch angles become smaller in the clockwise direction and the counterclockwise direction with respect to the reference 7. Therefore, maximum tooth pitch angles α21 are defined as first tooth pitch angles α21. On this occasion, at least one of the tooth pitch angles α11, α12, α13, α22, and α23 become smaller than the first tooth pitch angles α21 as proceeding from the first tooth pitch angles α2 in the clockwise direction and the counterclockwise direction, respectively. The tooth pitch angles are defined as second tooth pitch angles.

The cross-sectional areas of the coils 1 of phases U1, V1, W1, U2, V2, and W2 in the cross-section perpendicular to the rotation axis are different from each other. That is, the cross-sectional area of the third coil 1c, which is the coil 1 of U1 phase, in the cross-section perpendicular to the rotation axis is smaller than the cross-sectional area of the first coil 1a, which is the coil 1 of V1 phase, in the cross-section perpendicular to the rotation axis. The cross-sectional area of the fourth coil 1d, which is the coil 1 of W2 phase, in the cross-section perpendicular to the rotation axis is smaller than the cross-sectional area of the third coil 1c, which is the coil 1 of U1 phase, in the cross-section perpendicular to the rotation axis. The cross-sectional area of the second coil 1b, which is the coil 1 of V2 phase, in the cross-section perpendicular to the rotation axis is smaller than the cross-sectional area of the fourth coil 1d, which is the coil 1 of W2 phase, in the cross-section perpendicular to the rotation axis. The cross-sectional area of the fifth coil 1e, which is the coil 1 of W1 phase, in the cross-section perpendicular to the rotation axis is smaller than the cross-sectional area of the first coil 1a, which is the coil 1 of V1 phase, in the cross-section perpendicular to the rotation axis. The cross-sectional area of the sixth coil 1f, which is the coil 1 of U2 phase, in the cross-section perpendicular to the rotation axis is smaller than the cross-sectional area of the fifth coil 1e, which is the coil 1 of W1 phase, in the cross-section perpendicular to the rotation axis. The cross-sectional area of the second coil 1b, which is the coil 1 of V2 phase, in the cross-section perpendicular to the rotation axis is smaller than the cross-sectional area of the sixth coil 1f, which is the coil 1 of U2 phase, in the cross-section perpendicular to the rotation axis. The cross-sectional area of the fifth coil 1e, which is the coil 1 of W1 phase, in the cross-section perpendicular to the rotation axis is smaller than the cross-sectional area of the third coil 1c, which is the coil 1 of U1 phase, in the cross-section perpendicular to the rotation axis. The cross-sectional area of the fourth coil 1d, which is the coil 1 of W2 phase, in the cross-section perpendicular to the rotation axis is smaller than the cross-sectional area of the sixth coil 1f, which is the coil 1 of U2 phase, in the cross-section perpendicular to the rotation axis. Therefore, the cross-sectional area of the second coil 1b, which is the coil 1 of V2 phase, in the cross-section perpendicular to the rotation axis is smaller than the cross-sectional area of the first coil 1a, which is the coil 1 of V1 phase, in the cross-section perpendicular to the rotation axis.

Therefore, the first coil 1a, which is the coil 1 of V1 phase, and the third coil 1c, which is the coil of U1 phase, are arranged in the slot 13 formed between the adjacent teeth 2a and 2b corresponding to the first tooth pitch angle α21. The third coil 1c, which is the coil 1 of U1 phase, and the fourth coil 1d, which is the coil 1 of W2 phase, are arranged in the slot 13 formed between the adjacent teeth 2b and 2c corresponding to the tooth pitch angle α22. The fourth coil 1d, which is the coil 1 of W2 phase, and the second coil 1b, which is the coil 1 of V2 phase, are arranged in the slot 13 formed between the adjacent teeth 2c and 2d corresponding to the second tooth pitch angle α23. The first coil 1a, which is the coil 1 of V1 phase, and the fifth coil 1e, which is the coil 1 of W1 phase, are arranged in the slot 13 formed between the adjacent teeth 2a and 2f corresponding to the tooth pitch angle α11. The fifth coil 1e, which is the coil 1 of W1 phase, and the sixth coil 1f, which is the coil 1 of U2 phase, are arranged in the slot 13 formed between the adjacent teeth 2f and 2e corresponding to the tooth pitch angle α12. The sixth coil 1f, which is the coil 1 of U2 phase, and the second coil 1b, which is the coil 1 of V2 phase, are arranged in the slot 13 formed between the adjacent teeth 2e and 2d corresponding to the tooth pitch angle α13.

Further, the number of windings of each of the coils 1 is equal to each other. Therefore, the cross-sectional areas of the conductive wires in the cross-section perpendicular to the rotation axis are small in accordance with sizes of the cross-sectional areas of the coils 1 in the cross-section perpendicular to the rotation axis. That is, each of the plurality of coils 1 has the conductive wire wound around the tooth 2, and the cross-sectional area of the conductive wire of the second coil 1b in the cross-section perpendicular to the rotation axis is smaller than the cross-sectional area of the conductive wire of the first coil 1a in the cross-section perpendicular to the rotation axis. Further, a wire diameter of the conductive wire also becomes smaller in accordance with the sizes of the cross-sectional areas of the coils 1 in the cross-section perpendicular to the rotation axis.

A coil space factor, which is a ratio of the cross-sectional areas of the coils 1 in the cross-section perpendicular to the rotation axis to the slots 13 in which each coil 1 is mounted, is assumed to be the same. Therefore, the cross-sectional areas of the coils 1 in the cross section perpendicular to the rotation axis are asymmetric with respect to the reference 7 in the cross-section of FIG. 8. In such a configuration, resistance of the third coil 1c, which is the coil 1 of U1 phase, is larger than resistance of the first coil 1a, which is the coil 1 of V1 phase. Resistance of the fourth coil 1d, which is the coil 1 of W2 phase is larger than the resistance of the third coil 1c, which is the coil 1 of U1 phase. Resistance of the second coil 1b, which is the coil 1 of V2 phase is larger than the resistance of the fourth coil 1d, which is the coil 1 of W2 phase. Resistance of the fifth coil 1e, which is the coil 1 of W1 phase is larger than the resistance of the first coil 1a, which is the coil 1 of V1 phase. Resistance of the sixth coil 1f, which is the coil 1 of U2 phase is larger than the resistance of the fifth coil 1e, which is the coil 1 of W1 phase. The resistance of the second coil 1b, which is the coil 1 of V2 phase is larger than resistance of the sixth coil 1f, which is the coil 1 of U2 phase. Resistance of the fifth coil 1e, which is the coil 1 of W1 phase is larger than the resistance of the third coil 1c, which is the coil 1 of U1 phase. The resistance of the fourth coil 1d, which is the coil 1 of W2 phase is larger than the resistance of the sixth coil 1f, which is the coil 1 of U2 phase. Therefore, the resistance of the second coil 1b, which is the coil 1 of V2 phase is larger than the resistance of the first coil 1a, which is the coil 1 of V1 phase.

Further, the coils 1 of the same phases, that is, U1 and U2, V1 and V2, and W1 and W2 are connected in series, respectively. Meanwhile, the resistance of the coils 1 of each of phases are not equal to each other in some cases. Further, the currents of each of the phases are applied to the coils 1 in the same magnitude, with a result that the copper loss generated in the first coil 1a to the sixth coil 1f corresponds to a magnitude relationship of the coil resistance. In other words, in FIG. 8, as the cross-sectional areas of the coils 1 becomes small, that is, as the resistance of the coils 1 are increased, the copper loss generated in the coils 1 are increased.

Further, the widths of the teeth 2 in the circumferential direction are all equal, and the coil space factor of the coils 1 in each of the slots 13 is also equal. Therefore, a sum of the cross-sectional areas of all the coils 1 of the stator 20 in the cross-section perpendicular to the rotation axis is equal to a sum of the cross-sectional areas of the coils 1 in a configuration in which the tooth pitch angles α11, α12, α13, α21, α22, and α23 are all equal in the cross-section perpendicular to the rotation axis. Therefore, when the currents applied to the coils 1 are the same, a sum of the copper loss generated in the coils 1 is equal to a sum of the copper loss generated in the coils 1 in the configuration in which the tooth pitch angles α11, α12, α13, α21, α22, and α23 are all equal. That is, the tooth pitch angles α11, α12, α13, α21, α22, and α23 are shifted in the circumferential direction to have the same sum, and hence the copper loss generated in the coils 1 in the circumferential direction is distributed without changing the sum of the copper loss generated in the coils 1.

A cooling device used for cooling the rotating electric machine 100e according to this embodiment is described below. In a cooling device 40e of the rotating electric machine 100e according to this embodiment, in FIG. 8, an inlet 8a for allowing the cooling water to flow thereinto from an outside and flow out to a flow path 9 is provided between the teeth 2c and 2d in the circumferential direction on the outer periphery of the outer frame 12. An outlet 10a for allowing the cooling water to flow thereinto from the flow path 9 to be discharged to the outside is provided between the teeth 2a and 2b in the circumferential direction on the outer periphery of the outer frame 12 is arranged.

In this embodiment, as illustrated in FIG. 8, the inlet 8a for the cooling water of the cooling device 40e is arranged between the teeth 2c and 2d in the circumferential direction, that is, between the second coil 1b, which is the coil 1 of V2 phase having the largest copper loss to be generated, and the fourth coil 1d, which is the coil 1 of W2 phase in the circumferential direction. That is, a second cooling portion 42c, which is a portion surrounded by a two-dot chain line in a range from the inlet 8a for the cooling water of the cooling device 40e to the same circumferential positions as the circumferential positions of the second coil 1b and the fourth coil 1d, cools the second coil 1b, which is the coil 1 of V2 phase, and the fourth coil 1d, which is the coil 1 of W2 phase. The outlet 10a for the cooling water of the cooling device 40e is arranged between the teeth 2a and 2b in the circumferential direction, that is, between the first coil 1a, which is the coil 1 of V1 phase having the smallest copper loss to be generated, and the third coil 1c, which is the coil 1 of U1 phase in the circumferential direction. That is, a first cooling portion 42c, which is a portion surrounded by a two-dot chain line in a range from the outlet 10a for the cooling water of the cooling device 40e to the same circumferential positions as the circumferential positions of the first coil 1a and the third coil 1c, cools the first coil 1a, which is the coil 1 of V1 phase, and the third coil 1c, which is the coil 1 of U1 phase.

With such a configuration, the tooth pitch angle α23 including the second coil 1b having the largest copper loss to be generated is formed at the circumferential position of the inlet 8a at which cooling performance of the cooling device 40e is high. The tooth pitch angle α21 including the first coil 1a having the smallest copper loss to be generated is formed at the circumferential position of the outlet 10a at which cooling performance of the cooling device 40e is low. For this reason, the copper loss in the rotating electric machine 100e can be distributed in the circumferential direction in accordance with the circumferential distribution of the cooling performance of the cooling device 40e. That is, the cooling device 40e includes the first cooling portion 41c configured to cool the first coil 1a and the second cooling portion 42c configured to cool the second coil 1b. The cooling performance of the second cooling portion 42c is higher than the cooling performance of the first cooling portion 41c. Meanwhile, the cooling performance of the cooling device 40e is asymmetric with respect to the reference 7. That is, the cooling performance of the cooling device 40e in the circumferential range from the inlet 8a toward the outlet 10a counterclockwise is higher than the cooling performance of the cooling device 40e in the circumferential range from the inlet 8a toward the outlet 10a clockwise. Therefore, the cooling device 40e can efficiently cool the rotating electric machine 100e in accordance with the copper loss distribution of the rotating electric machine 100e.

Sixth Embodiment

Figure 9:
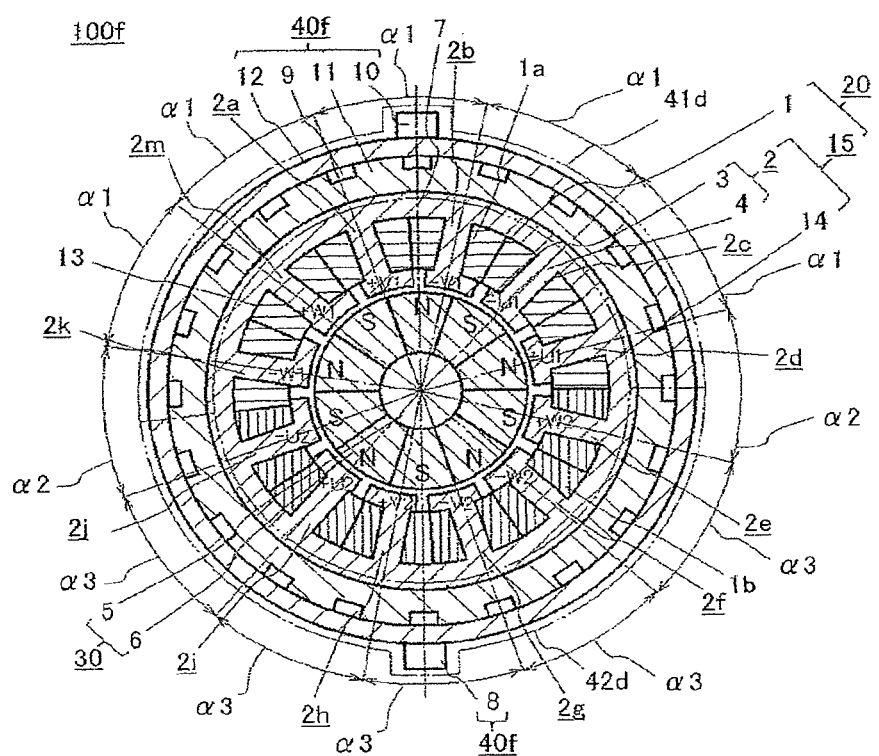
FIG. 9 is a sectional view of a rotating electric machine according to a sixth embodiment of the present invention taken perpendicular to a rotation axis direction.

FIG. 9 is a sectional view of a rotating electric machine according to a sixth embodiment for implementing the present invention taken perpendicular to a rotation axis direction. A configuration of a rotating electric machine 100f according to this embodiment is different from the first embodiment in the following points. In FIG. 9, in the rotating electric machine 100f according to this embodiment, the number of magnetic poles is ten, and the number of slots 13 is twelve. In FIG. 9, a boundary between the coil 1 of +V1 phase and the coil 1 of −V1 phase arranged between the teeth 2a and 2b is set as the reference 7. The twelve teeth 2 are denoted by reference symbols 2b, 2c, 2d, 2e, 2f, 2g, 2h, 2i, 2j, 2k, and 2m in a clockwise order from the tooth center axis of the tooth 2a having the coil 1 of +V1 phase wound therearound. Then, in the cross-section of FIG. 9, the phases of the twelve coils 1 wound around the teeth 2a to 2m, respectively are arranged in the order of +V1, −V1, −U1, +U1, +W2, −W2, −V2, +V2, +U2, −U2, −W1, and +W1 clockwise from the tooth 2a. The signs "+" and "−" represent winding polarities of the coils 1 different from each other, and indicate that directions of the electromagnetic field generated in the coils 1 are opposite to each other in the radial direction when the currents in the same direction flow through the coils 1. That is, the rotating electric machine 100f according to this embodiment has a structure in which sets of five magnetic poles and six slots are repeated two-times in the circumferential direction with the inverted polarities of the magnetic poles. The phases of the coils 1 are formed by phases of the coils 1 of the first set −W1, +W1, +V1, −V1, −U1, and +U1, and phases of the coils 1 of the second set +W2, −W2, −V2, +V2, +U2, and −U2. Thus, the magnetic structure of the rotating electric machine 100f has a structure of two-times rotational asymmetry in the circumferential direction, that is, in the rotation direction.

Angles formed by the tooth center axes of the adjacent teeth 2 among the plurality of teeth 2 are defined as tooth pitch angles α1, α2, and α3. The tooth pitch angles α1 are angles formed by the tooth center axes of the teeth 2k and 2m, the tooth center axes of the teeth 2m and 2a, the tooth center axes of the teeth 2a and 2b, the tooth center axes of the teeth 2b and 2c, and the tooth center axes of the teeth 2c and 2d. The tooth pitch angles α2 are angles formed by tooth center axes of the teeth 2d and 2e and tooth center axes of the teeth 2j and 2k. The tooth pitch angles α3 are angles formed by the tooth center axes of the teeth 2e and 2f, the tooth center axes of the teeth 2f and 2g, the tooth center axes of the teeth 2g and 2h, the tooth center axes of the teeth 2h and 2i, and the tooth center axes of the teeth 2i and 2j. The tooth pitch angles are set to α1=32°, α2=30°, and α3=28°.

The tooth pitch angles become smaller in the clockwise direction and the counterclockwise direction with respect to the reference 7. Therefore, maximum tooth pitch angles α1 are defined as first tooth pitch angles α1. On this occasion, at least one of the tooth pitch angles α2 and α3 become smaller than the first tooth pitch angles α1 as proceeding from the first tooth pitch angles α1 in the clockwise direction and the counterclockwise direction, respectively. The tooth pitch angles are defined as second tooth pitch angles.

Further, the greatest common divisor between 10, which is the number of the plurality of magnetic poles, and 12, which is the number of the plurality of teeth 2 is 2. In the cross-section of the stator 20 perpendicular to the rotation axis, the tooth pitch angles α1 are continuous by five in the clockwise direction or the counterclockwise direction. The number "5" is obtained by dividing 12 being the number of plurality of teeth by 2 being the greatest common divisor 2 and subtracting 1 from 6 being a quotient of the division. The tooth pitch angles α1 continuous by two in the clockwise direction or the counterclockwise direction are equal to each other. In the cross-section of the stator 20 perpendicular to the rotation axis, the tooth pitch angles α3 are continuous by five in a clockwise direction or a counterclockwise direction. The number "5" is obtained by dividing 12 being the number of plurality of teeth by 2 being the greatest common divisor 2 and subtracting 1 from 6 being a quotient of the division. Further, the tooth pitch angles α3 continuous by five in the clockwise direction or the counterclockwise direction are equal to each other.

Widths of the teeth 2a to 2m in the circumferential direction are all equal. Therefore, cross-sectional areas of the slots 13 formed between adjacent teeth 2 in a cross-section perpendicular to the rotation axis also become smaller as proceeding from the reference 7 toward the clockwise direction and the counterclockwise direction. That is, the cross-sectional areas of the coils 1 of phases of the second set +W2, −W2, −V2, +V2, +U2, and −U2 in the the cross-section perpendicular to the rotation axis become smaller than the cross-sectional areas of the coils 1 of phases of the first set −W1, +W1, +V1, −V1, −U1, and +U1 in the cross-section perpendicular to the rotation axis. Further, the cross-sectional areas of the coils 1 of phases of the first set −W1, +W1, +V1, −V1, −U1, and +U1 in the cross-section perpendicular to the rotation axis are equal to each other. The cross-sectional areas of the coils 1 of phases of the second set +W2, −W2, −V2, +V2, +U2, and −U2 in the cross-section perpendicular to the rotation axis are equal to each other.

Further, the configuration of the teeth 2 has a configuration such that the tooth pitch angles α1, α2, and α3 vary, but only the base portions 4 of the teeth 2 are shifted in the circumferential direction. Therefore, distances in the circumferential direction each defined between one end of both ends of the distal end portion 3 of one tooth 2 in the circumferential direction and another end of both ends of distal end portion 3 of another tooth in the circumferential direction, which is adjacent to the one end of the both ends of the distal end portion 3 of the one tooth 2 in the circumferential direction, are all equal. Further, widths of the distal end portions 3 of the twelve teeth 2 in the circumferential direction are all equal.

In the rotating electric machine 100f of this embodiment, the cross-sectional areas of the coils 1 in the cross-section perpendicular to the rotation axis are symmetric with respect to the reference 7. The coils 1 of phases of the first set −W1, +W1, +V1, −V1, −U1, and +U1, which are arranged in the slots 13 each formed between adjacent teeth 2k and 2m, between 2m and 2a, between 2a and 2b, between 2b and 2c, and between ca and 2d corresponding to the first tooth pitch angles α1, are defined as first coils 1a. Further, the coils 1 of phases of the second set +W2, −W2, −V2, +V2, +U2, and −U2, which are arranged in the slots 13 each formed between adjacent teeth 2e and 2f, between 2f and 2g, between 2g and h, between 2h and 2i, and between 2i and 2j corresponding to the second tooth pitch angles α3, are defined as second coils 1b. The first coils 1a and the second coils 1b are arranged in the respective slots 13 formed between adjacent teeth 2d and 2e, and between 2j and 2k corresponding to the tooth pitch angles α2. Cross-sectional areas of the second coils 1b in the cross-section perpendicular to rotation axis are smaller than cross-sectional areas of the first coils 1a in the cross-section perpendicular to the rotation axis.

Further, the number of windings of each of the coils 1 is equal to each other. Therefore, the cross-sectional areas of the conductive wires in the cross-section perpendicular to the rotation axis are smaller in accordance with sizes of the cross-sectional areas of the coils 1 in the cross-section perpendicular to the rotation axis. That is, each of the plurality of coils 1 has the conductive wire wound around the tooth 2, and the cross-sectional area of the conductive wire of the second coil 1b in the cross-section perpendicular to the rotation axis is smaller than the cross-sectional area of the conductive wire of the first coil 1a in the cross-section perpendicular to the rotation axis. Further, a wire diameter of the conductive wire also becomes smaller in a similar manner in accordance with the sizes of the cross-sectional areas of the coils 1 in the cross-section perpendicular to the rotation axis.

Resistance of the first coils 1a which are the phases of the coils 1 of the first set −W1, +W1, +V1, −V1, −U1 is smaller than resistance of the second coils 1b which are phases of the coils 1 of the second set +W2, −W2, −V2, +V2, +U2, and −U2. Therefore, in the rotating electric machine 100f of this embodiment, the copper loss in the first coils 1a which are located in a circumferential range of about one-half of the upper portion in the radial direction of the rotating electric machine 100f becomes smaller than the copper loss in the second coils 1b of about one-half of the lower portion in the radial direction of the rotating electric machine 100f.

A second cooling portion 42d, which is a portion surrounded by a two-dot chain line in a range from the inlet 8 for the cooling water of the cooling device 40f to the same circumferential positions as the circumferential positions of the second coils 1b, cools the second coils 1b. The outlet 10 for the cooling water of the cooling device 40f is arranged at the same circumferential positions of the coils 1 which generate a less copper loss than the second coils 1b, that is, the first coils 1a. That is, a first cooling portion 41d, which is a portion surrounded by a two-dot chain line in a range from the outlet 10 for the cooling water of the cooling device 40f to the same circumferential positions as the circumferential positions of the first coils 1a, cools the first coils 1a.

With such a configuration, the circumferential positions of the second coils 1b, which generate a large copper loss, are set at the circumferential position of the inlet 8 at which cooling performance of the cooling device 40f is high. Therefore, it is possible to distribute the copper loss in the rotating electric machine 100 in the circumferential direction in accordance with the circumferential distribution of the cooling performance of the cooling device 40f. That is, the cooling device 40f includes the first cooling portion 41d configured to cool the first coils 1a and the second cooling portion 42d configured to cool the second coils 1b. The cooling performance of the second cooling portion 42d is higher than the cooling performance of the first cooling portion 41d.

Therefore, the cooling device 40f has lower cooling performance at the first cooling portion 41d located in the circumferential range of about one-half of the upper portion of the rotating electric machine 100f in the radial direction, and has higher cooling performance at the second cooling portion 42d located in the circumferential range of about one-half of the lower portion of the rotating electric machine 100f in the radial direction, and cooling can be performed efficiently. With such a configuration, a similar effect as the first embodiment can be attained by changing the tooth pitch angles α1, α2, and α3 in accordance with the ratio of the cooling performance distribution of the cooling device 40f in the circumferential direction.

In FIG. 9, the distal end portions 3 of the teeth 2d and 2e are asymmetric with respect to each of the tooth center axes, but may be symmetric. For example, in the configuration of FIG. 9, only the distal end portion 3 of another teeth may be rotated to shift in the circumferential direction, and the asymmetry may be reduced with respect to the tooth center axes of the distal end portions 3. In this case, a difference between a length of the distal end portions 3 which protrudes in one circumferential direction from the teeth 2 and a length which protrudes in another circumferential direction from the teeth 2 is reduced. Therefore, there is an advantage such as easy winding of the coils 1 around the teeth 2.

As in this embodiment, a configuration in which polarities of sets of seven magnetic poles and six slots, or sets of eleven magnetic poles and twelve slots are inverted and repeated may be taken rather than the configuration in which the polarities of the sets of the five magnetic poles and six slots are inverted and repeated. With such a configuration having an odd number of magnetic poles, the same effects as this embodiment can also be attained. Further, a configuration in which sets of ten magnetic poles and twelve slots are repeated and the polarities thereof are not inverted may be taken.

REFERENCE SIGNS LIST 1 coil, 1a first coil, 1b second coil, 1c third coil, 1d fourth coil, 1e fifth coil, 1f sixth coil, 2, 2a, 2b, 2c, 2d, 2e, 2f, 2g, 2h, 2i, 2j, 2k, 2m teeth, 3 distal end portion, 4 base portion, 5 shaft, 6 permanent magnet, 7 reference, 8, 8a inlet, 9 flow path, 10, 10a outlet, 11 inner frame, 12 outer frame, 13 slot, 14 core back, 15, 15a stator core, 16 bracket, 17 bearing, 20, 20a, 20b, 20c, 20d, 20e stator, 30, 30a, 30b, 30c rotor, 40, 40c, 40d, 40e, 40f cooling device, 40a first cooling device, 40b second cooling device, 41, 41a, 41b, 41c, 41d first cooling portion, 42, 42a, 42b, 42c, 42d second cooling portion, 100, 100a, 100b, 100c, 100d, 100e, 100f rotating electric machine

The invention claimed is:

1. A rotating electric machine, comprising:
a rotor which is supported so as to be freely rotatable about a rotation axis; and
a stator including:
 a yoke portion which has an annular shape and is arranged coaxially with the rotor;
 a plurality of teeth which protrude from the yoke portion toward a rotor side and are arranged side-by-side in a circumferential direction; and
 a plurality of coils which are accommodated in slots each formed between adjacent teeth of the plurality of teeth,
wherein, in a cross-section perpendicular to the rotation axis, straight lines passing through centers of the teeth in the circumferential direction and the rotation axis are defined as tooth center axes, angles formed by the tooth center axes of the adjacent teeth among the plurality of teeth are defined as tooth pitch angles, and a maximum tooth pitch angle among the tooth pitch angles is defined as a first tooth pitch angle,
wherein at least one tooth pitch angle among the tooth pitch angles is smaller as proceeding from the first tooth pitch angle in a clockwise direction and a counterclockwise direction, respectively, and is defined as a second tooth pitch angle,
wherein, a first coil of the plurality of coils arranged in one of the slots each formed between first adjacent teeth corresponding to the first tooth pitch angle is defined as the first coil, and a second coil of the plurality of coils arranged in another of the slots each formed between second adjacent teeth corresponding to the second tooth pitch angle is defined as the second coil,
wherein a cross-sectional area of the second coil is cross-section perpendicular to the rotation axis is smaller than a cross-sectional area of the first coil in the cross-section perpendicular to the rotation axis,
wherein each of the plurality of coils has a conductive wire wound around corresponding one of the teeth, and
wherein a cross-sectional area of the conductive wire of the second coil in the cross-section perpendicular to the rotation axis is smaller than a cross-sectional area of the conductive wire of the first coil in the cross-section perpendicular to the rotation axis.

2. The rotating electric machine according to claim 1, wherein the plurality of coils include a plurality of phase coils through which a current of one phase flows, and
wherein the plurality of phase coils through which the current of one phase flows are connected in series.

3. The rotating electric machine according to claim 1, wherein the plurality of coils include a plurality of phase coils through which a current of one phase flows, and
wherein the plurality of phase coils through which the current of one phase flows are connected in parallel.

4. The rotating electric machine according to claim 1, wherein each of the plurality of teeth includes a base portion which protrudes from the yoke portion toward the rotor side and has a distal end portion at a distal end of the base portion in a direction toward the rotor side,
wherein distances in the circumferential direction each defined between one end of both ends of the distal end portion of one tooth in the circumferential direction and another end of both ends of the distal end portion of another tooth in the circumferential direction, which is adjacent to the one end of said both ends the distal end portion of the one tooth in the circumferential direction of the distal end portions, are all equal, and wherein widths of the distal end portions of the plurality of teeth in the circumferential direction are all equal.

5. The rotating electric machine according to claim 1, further comprising:
a first cooling device configured to cool the first coil; and
a second cooling device configured to cool the second coil, and
wherein cooling performance of the second cooling device is greater than cooling performance of the first cooling device.

6. The rotating electric machine according to claim 1, wherein in the cross-section perpendicular to the rotation axis, portions of each of the coils on opposite sides of the teeth have a same area.

7. The rotating electric machine according to claim 1, wherein at least some of the slots include a pair of different coils of the plurality of coils.

8. A rotating electric machine, comprising:
a rotor which is supported so as to be freely rotatable about a rotation axis; and
a stator including:
a yoke portion which has an annular shape and is arranged coaxially with the rotor;
a plurality of teeth which protrude from the yoke portion toward a rotor side and are arranged side-by-side in a circumferential direction; and
a plurality of coils which are accommodated in slots each formed between adjacent teeth of the plurality of teeth,
wherein, in a cross-section perpendicular to the rotation axis, straight lines passing through centers of the teeth in the circumferential direction and the rotation axis are defined as tooth center axes, angles formed by the tooth center axes of the adjacent teeth among the plurality of teeth are defined as tooth pitch angles, and a maximum tooth pitch angle among the tooth pitch angles is defined as a first tooth pitch angle,
wherein at least one tooth pitch angle among the tooth pitch angles is smaller as proceeding from the first tooth pitch angle in a clockwise direction and a counterclockwise direction, respectively, and is defined as a second tooth pitch angle,
wherein, a first coil of the plurality of coils arranged in one of the slots each formed between first adjacent teeth corresponding to the first tooth pitch angle is defined as the first coil, and a second coil of the plurality of coils arranged in another of the slots each formed between second adjacent teeth corresponding to the second tooth pitch angle is defined as the second coil,
wherein a cross-sectional area of the second coil is cross-section perpendicular to the rotation axis is smaller than a cross-sectional area of the first coil in the cross-section perpendicular to the rotation axis,
wherein the rotor includes a plurality of magnetic poles, and
wherein, in the cross-section perpendicular to the rotation axis, tooth pitch angles continuous in the clockwise direction or the counterclockwise direction by the number is obtained by dividing the number of the plurality of teeth by a greatest common divisor between the number of the plurality of magnetic poles and the number of the plurality of teeth subtracting 1 from a quotient of the division are equal to each other.

9. The rotating electric machine according to claim 8, wherein the plurality of coils include a plurality of phase coils through which a current of one phase flows, and
wherein the plurality of phase coils through which the current of one phase flows are connected in series.

10. The rotating electric machine according to claim 2, wherein the plurality of coils include a plurality of phase coils through which a current of one phase flows, and
wherein the plurality of phase coils through which the current of one phase flows are connected in parallel.

11. The rotating electric machine according to claim 8, wherein each of the plurality of teeth includes a base portion which protrudes from the yoke portion toward the rotor side and has a distal end portion at a distal end of the base portion in a direction toward the rotor side,
wherein distances in the circumferential direction each defined between one end of both ends of the distal end portion of one tooth in the circumferential direction and another end of both ends of the distal end portion of another tooth in the circumferential direction, which is adjacent to the one end of said both ends the distal end portion of the one tooth in the circumferential direction of the distal end portions, are all equal, and
wherein widths of the distal end portions of the plurality of teeth in the circumferential direction are all equal.

12. The rotating electric machine according to claim 8, further comprising:
a first cooling device configured to cool the first coil; and
a second cooling device configured to cool the second coil, and
wherein cooling performance of the second cooling device is greater than cooling performance of the first cooling device.

13. The rotating electric machine according to claim 5, wherein in the cross-section perpendicular to the rotation axis, portions of each of the coils on opposite sides of the teeth have a same area.

14. The rotating electric machine according to claim 8, wherein at least some of the slots include a pair of different coils of the plurality of coils.

15. A rotating electric machine, comprising:
a rotor which is supported so as to be freely rotatable about a rotation axis; and
a stator including:
a yoke portion which has an annular shape and is arranged coaxially with the rotor;
a plurality of teeth which protrude from the yoke portion toward a rotor side and are arranged side-by-side in a circumferential direction; and
a plurality of coils which are accommodated in slots each formed between adjacent teeth of the plurality of teeth,
wherein, in a cross-section perpendicular to the rotation axis, straight lines passing through centers of the teeth in the circumferential direction and the rotation axis are defined as tooth center axes, angles formed by the tooth center axes of the adjacent teeth among the plurality of teeth are defined as tooth pitch angles, and a maximum tooth pitch angle among the tooth pitch angles is defined as a first tooth pitch angle,
wherein at least one tooth pitch angle among the tooth pitch angles is smaller as proceeding from the first tooth pitch angle in a clockwise direction and a counterclockwise direction, respectively, and is defined as a second tooth pitch angle, wherein, a first coil of the plurality of coils arranged in one of the slots each formed between first adjacent teeth corresponding to the first tooth pitch angle is defined as the first coil, and a second coil of the plurality of coils arranged in another of the slots each formed between second adjacent teeth corresponding to the second tooth pitch angle is defined as the second coil, wherein a cross-sectional area of the second coil is cross-section perpendicular to the rotation axis is smaller than a cross-sectional area of the first coil in the cross-section perpendicular to the rotation axis, wherein the cooling device includes:
- a first cooling portion configured to cool the first coil; and
- a second cooling portion configured to cool the second coil, and wherein cooling performance of the second cooling portion is greater than cooling performance of the first cooling portion.

16. The rotating electric machine according to claim 15, wherein the plurality of coils include a plurality of phase coils through which a current of one phase flows, and wherein the plurality of phase coils through which the current of one phase flows are connected in series.

17. The rotating electric machine according to claim 15, wherein the plurality of coils include a plurality of phase coils through which a current of one phase flows, and wherein the plurality of phase coils through which the current of one phase flows are connected in parallel.

18. The rotating electric machine according to claim 15, wherein each of the plurality of teeth includes a base portion which protrudes from the yoke portion toward the rotor side and has a distal end portion at a distal end of the base portion in a direction toward the rotor side, wherein distances in the circumferential direction each defined between one end of both ends of the distal end portion of one tooth in the circumferential direction and another end of both ends of the distal end portion of another tooth in the circumferential direction, which is adjacent to the one end of said both ends the distal end portion of the one tooth in the circumferential direction of the distal end portions, are all equal, and wherein widths of the distal end portions of the plurality of teeth in the circumferential direction are all equal.

19. The rotation electric machine according to claim 15, wherein in the cross-section perpendicular to the rotation axis, portions of each of the coils on opposite sides of the teeth have a same area.

20. The rotation electric machine according to claim 15, wherein at least some of the slots include a pair of different coils of the plurality of coils.

* * * * *